(12) United States Patent
Yamazaki et al.

(10) Patent No.: US 9,581,206 B2
(45) Date of Patent: Feb. 28, 2017

(54) FIXED TYPE CONSTANT VELOCITY UNIVERSAL JOINT

(71) Applicants: Kisao Yamazaki, Shizuoka (JP); Hiroyasu Hirukawa, Shizuoka (JP); Kenta Yamazaki, Shizuoka (JP)

(72) Inventors: Kisao Yamazaki, Shizuoka (JP); Hiroyasu Hirukawa, Shizuoka (JP); Kenta Yamazaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/432,329

(22) PCT Filed: Sep. 19, 2013

(86) PCT No.: PCT/JP2013/075271
§ 371 (c)(1),
(2) Date: Mar. 30, 2015

(87) PCT Pub. No.: WO2014/057781
PCT Pub. Date: Apr. 17, 2014

(65) Prior Publication Data
US 2015/0240878 A1    Aug. 27, 2015

(30) Foreign Application Priority Data

Oct. 12, 2012    (JP) .................................. 2012-226939

(51) Int. Cl.
*F16D 3/223*    (2011.01)
*F16D 3/2233*    (2011.01)
(Continued)

(52) U.S. Cl.
CPC ............. *F16D 3/223* (2013.01); *F16D 3/224* (2013.01); *F16D 3/2233* (2013.01);
(Continued)

(58) Field of Classification Search
CPC .......... F16D 3/22; F16D 3/223; F16D 3/2233; F16D 3/2237; F16D 3/224; F16D 3/24; F16D 2003/22306; F16D 2003/22309
(Continued)

(56) References Cited

U.S. PATENT DOCUMENTS 6,306,044 B1    10/2001    Schwärzler
6,506,122 B2 *    1/2003    Nakagawa ............ F16D 3/2237
                                                                    464/145
(Continued)

FOREIGN PATENT DOCUMENTS

JP    2000-266071    9/2000
JP    2002-5186    1/2002
(Continued)

OTHER PUBLICATIONS

Translation of JP 2009-250365. Fujio, et al. Constant Velocity Universal Joint. Oct. 29, 2009.*
(Continued)

*Primary Examiner* — Josh Skroupa
(74) *Attorney, Agent, or Firm* — Wenderoth, Lind & Ponack, L.L.P.

(57) ABSTRACT

A fixed type constant velocity universal joint has an outer joint member including first track groove portions and second track groove portions. Each of the first track groove portions includes an arc part having a curvature center that is not offset in an axial direction with respect to a joint center. The first track groove portions are inclined in a peripheral direction of the outer joint member with respect to a joint axial line and adjacent to each other in the peripheral direction with inclination directions opposite to each other. Each of the second track groove portions has a different shape than the first track groove portions. Each of the first track groove portions and each of the second track (Continued)

groove portions are connected to each other at a position on an opening side with respect to the joint center.

14 Claims, 24 Drawing Sheets

(51) Int. Cl.
    *F16D 3/224* (2011.01)
    *F16D 3/24* (2006.01)
    *F16D 3/2237* (2011.01)

(52) U.S. Cl.
    CPC .. *F16D 3/2237* (2013.01); *F16D 2003/22306* (2013.01); *F16D 2003/22309* (2013.01); *Y10S 464/906* (2013.01)

(58) Field of Classification Search
    USPC .......................................... 464/145, 146, 906
    See application file for complete search history.

(56) References Cited

U.S. PATENT DOCUMENTS

| | | | | |
|---|---|---|---|---|
| 8,568,245 | B2 * | 10/2013 | Fujio | F16D 3/224 464/144 |
| 2001/0046900 | A1 | 11/2001 | Song | |
| 2002/0022528 | A1 | 2/2002 | Nakagawa et al. | |
| 2002/0077186 | A1 | 6/2002 | Hosoya et al. | |
| 2003/0017877 | A1 | 1/2003 | Kobayashi et al. | |
| 2005/0261067 | A1 | 11/2005 | Kobayashi et al. | |
| 2011/0212789 | A1 | 9/2011 | Ooba et al. | |
| 2012/0202607 | A1 | 8/2012 | Fujio | |
| 2013/0102397 | A1 | 4/2013 | Ooba | |
| 2013/0267332 | A1 | 10/2013 | Fujio | |

FOREIGN PATENT DOCUMENTS

| | | | |
|---|---|---|---|
| JP | 2002-188653 | 7/2002 | |
| JP | 2002-323061 | 11/2002 | |
| JP | 2009-250365 | 10/2009 | |
| JP | 2012-17809 | 1/2012 | |
| JP | 2012-141051 | 7/2012 | |
| WO | 01/61203 | 8/2001 | |
| WO | WO 2011043268 A1 * | 4/2011 | ............. F16D 3/224 |

OTHER PUBLICATIONS

Translation of JP 2012-017809. Oba, Hirokazu. Fixed-Type Constant Velocity Universal Joint. Jan. 26, 2012.*
International Preliminary Report on Patentability and Written Opinion of the International Searching Authority issued Apr. 14, 2015 in International (PCT) Application No. PCT/JP2013/075271.
International Search Report issued Nov. 12, 2013 in International (PCT) Application No. PCT/JP2013/075271.
Extended European Search Report issued Aug. 9, 2016 in corresponding European Application No. 13846143.9.

* cited by examiner

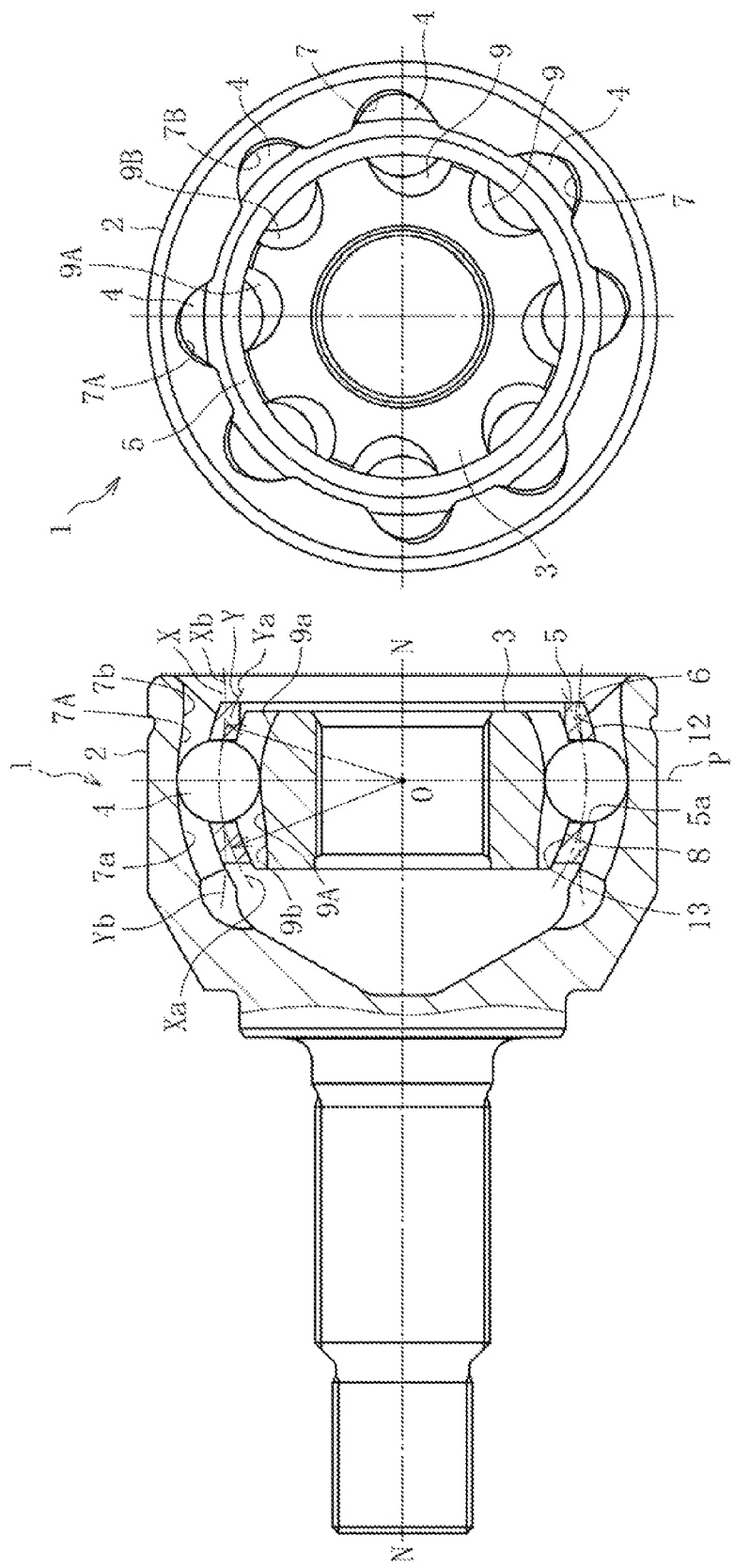

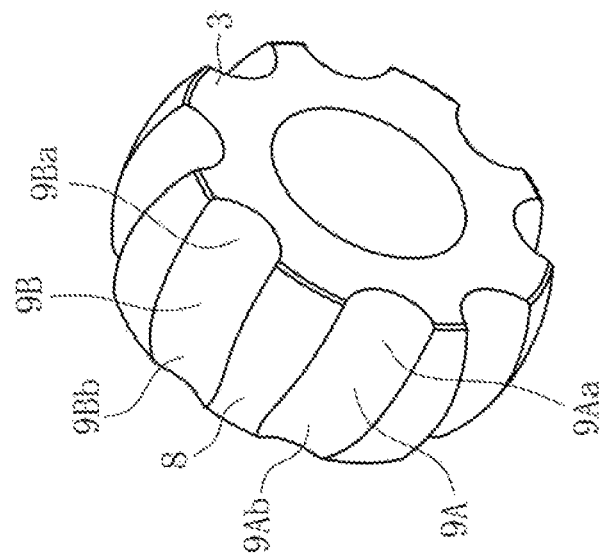
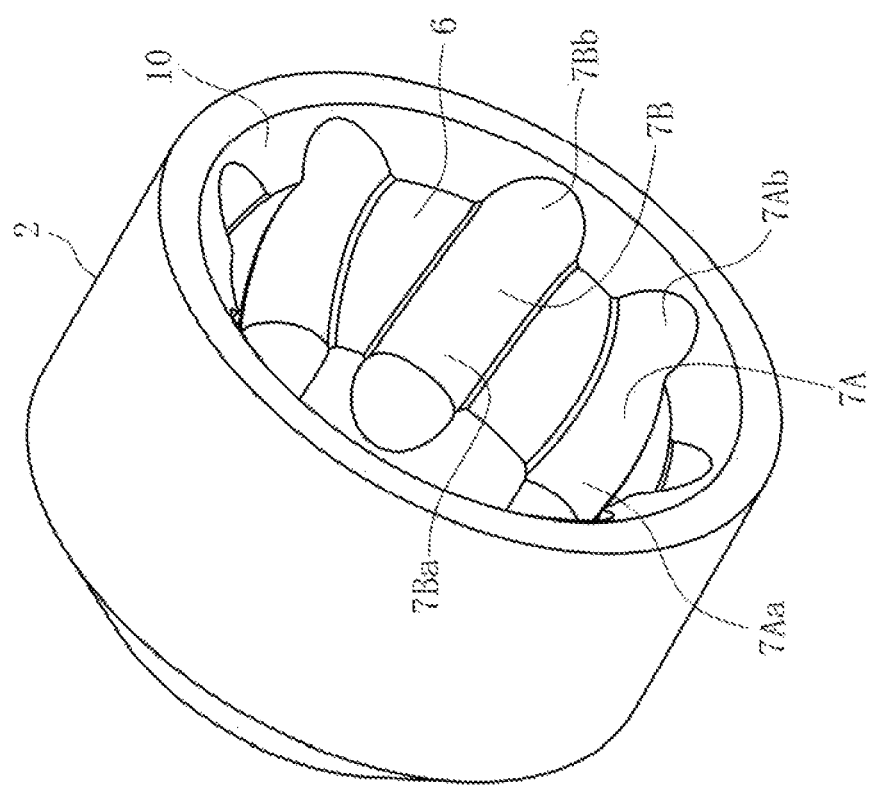

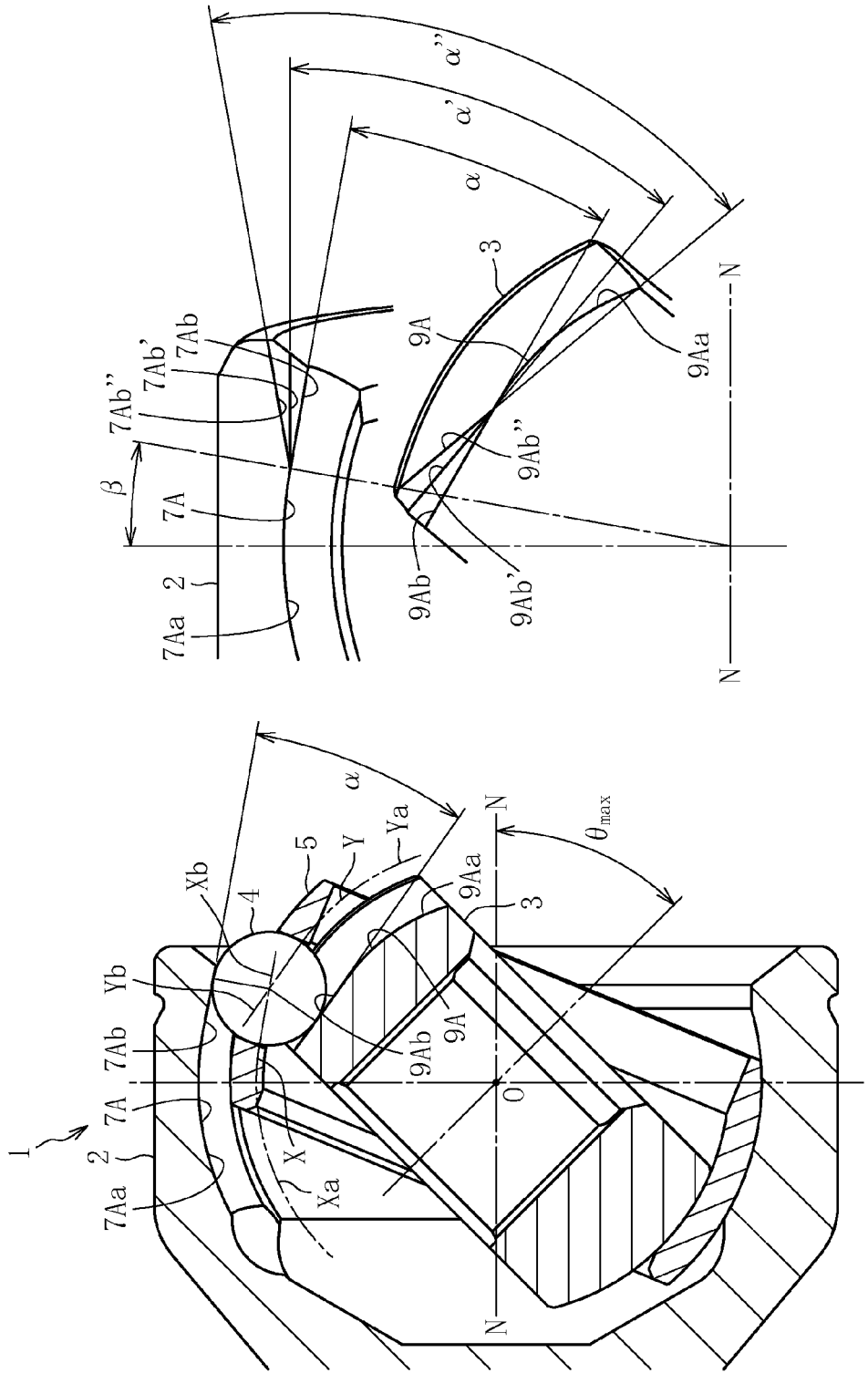

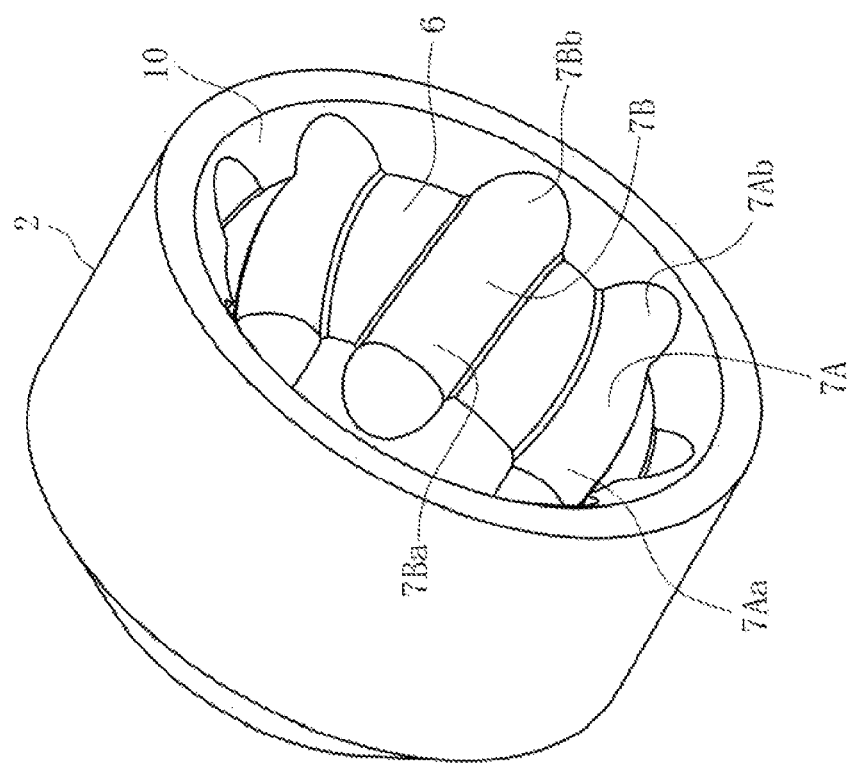
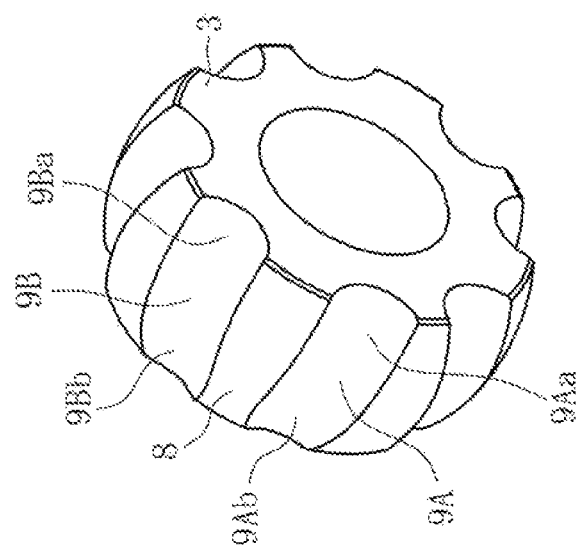

FIXED TYPE CONSTANT VELOCITY UNIVERSAL JOINT

TECHNICAL FIELD

The present invention relates to a fixed type constant velocity universal joint, and more specifically, to a fixed type constant velocity universal joint to be used in a power transmission system of automobiles and various industrial machines, for allowing only angular displacement between two shafts on a driving side and a driven side.

BACKGROUND ART

For example, a plunging type constant velocity universal joint that is axially displaceable while forming an operating angle but forms a relatively small maximum operating angle is generally assembled on an inboard side (differential side) of an automotive front drive shaft. Further, a fixed type constant velocity universal joint that can form a large operating angle but is not axially displaceable is generally assembled on an outboard side (wheel side) of the automotive front drive shaft because the wheel is steered on the outboard side.

FIG. 23 illustrate a Rzeppa type constant velocity universal joint 101 as an example of the fixed type constant velocity universal joint that is used on the outboard side. FIG. 23a is a vertical sectional view of a state at an operating angle of 0°, and FIG. 23b is a schematic view of a state in which a maximum operating angle is formed. As illustrated in FIG. 23a, the constant velocity universal joint 101 mainly includes an outer joint member 102, an inner joint member 103, balls 104, and a cage 105. Eight track grooves 107 are formed equiangularly in a spherical inner peripheral surface 106 of the outer joint member 102 so as to extend along an axial direction. Track grooves 109 opposed to the track grooves 107 of the outer joint member 102 are formed equiangularly in a spherical outer peripheral surface 108 of the inner joint member 103 so as to extend along the axial direction. Eight balls 104 for transmitting torque are interposed between the track grooves 107 of the outer joint member 102 and the track grooves 109 of the inner joint member 103. The cage 105 for holding the balls 104 is arranged between the spherical inner peripheral surface 106 of the outer joint member 102 and the spherical outer peripheral surface 108 of the inner joint member 103. An outer periphery of the outer joint member 102 and an outer periphery of a shaft coupled to the inner joint member 103 are covered with a boot, and grease is sealed inside the joint as a lubricant (not shown).

As illustrated in FIG. 23a, the cage 105 has a spherical outer peripheral surface 112 fitted to the spherical inner peripheral surface 106 of the outer joint member 102, and a spherical inner peripheral surface 113 fitted to the spherical outer peripheral surface 108 of the inner joint member 103. The spherical outer peripheral surface 112 and the spherical inner peripheral surface 113 each have a curvature center formed at a joint center O. On the other hand, a curvature center Oo of a ball raceway center line x of each track groove 107 of the outer joint member 102 and a curvature center Oi of a ball raceway center line y of each track groove 109 of the inner joint member 103 are offset to both sides in the axial direction by equal distances with respect to the joint center O. Therefore, when the joint forms an operating angle, the balls 104 are always guided in a plane bisecting an angle formed between axial lines of the outer joint member 102 and the inner joint member 103. As a result, rotational torque is transmitted at a constant velocity between the two axes.

As illustrated in FIG. 23b, a maximum operating angle $\theta_{max}$, which is defined as a main function of the fixed type constant velocity universal joint 101, depends on an angle causing interference between an inlet chamfer 110 formed at an opening rim of the outer joint member 102 and a shaft 111. In order to secure permissible torque to be transmitted, an axial diameter d of the shaft 111 is determined for each joint size. When a large inlet chamfer 110 is formed, the length of each track groove 107 of the outer joint member 102, on which the ball 104 is brought into contact (hereinafter referred to as "effective track length"), is insufficient. As a result, the ball 104 may drop off the track groove 107, and the rotational torque cannot be transmitted. Therefore, how the inlet chamfer 110 is formed while securing the effective track length of the outer joint member 102 is an important factor in securing the operating angle. In the Rzeppa type constant velocity universal joint 101, the curvature center Oo of the ball raceway center line x of the track groove 107 of the outer joint member 102 is offset to an opening side. Thus, there is an advantage in terms of the maximum operating angle, and the maximum operating angle $\theta_{max}$ is approximately 47°.

Further, as compared to a related-art constant velocity universal joint of a six ball type, the Rzeppa type constant velocity universal joint 101 of the eight ball type has a smaller track offset amount, a larger number of balls, and has a smaller diameter. Thus, it is possible to attain a highly efficient constant velocity universal joint that is lightweight and compact, and is suppressed in torque loss. However, as illustrated in FIG. 24, at an operating angle of 0°, wedge angles α formed between the opposed track grooves 107 and 109 of the outer joint member 102 and the inner joint member 103 (as illustrated in FIG. 24, the contact points between the ball 104 and the track grooves 107 and 109 are positioned on the broken lines) are opened toward the opening side of the outer joint member 102. Therefore, due to axial force W applied from the track grooves 107 and 109 to the balls 104, loads to be applied to the spherical contact portions 106 and 112 of the outer joint member 102 and the cage 105 and the spherical contact portions 108 and 113 of the inner joint member 103 and the cage 105 are generated in a certain direction. In this structure, as illustrated in FIG. 24, the outer joint member 102 and the cage 105 are held in contact with each other at a part J, and the inner joint member 103 and the cage 105 are held in contact with each other at a part I, which leads to restriction on achieving even higher efficiency and less heat generation.

In order to achieve even higher efficiency and less heat generation than those of the above-mentioned Rzeppa type constant velocity universal joint 101 of the eight ball type, a fixed type constant velocity universal joint of a track groove crossing type has been proposed (JP 2009-250365 A). FIGS. 25 and 26 illustrate the constant velocity universal joint of this type. FIG. 25 is a vertical sectional view at an operating angle of 0°, and FIGS. 26 are views at a high operating angle. As illustrated in FIG. 25, a constant velocity universal joint 121 mainly includes an outer joint member 122, an inner joint member 123, balls 124, and a cage 125. Although illustration is omitted, in the constant velocity universal joint 121 of the track groove crossing type, planes including ball raceway center lines x of eight track grooves 127 of the outer joint member 122 are inclined with respect to a joint axial line n-n with their inclination directions opposite to each other in the track grooves 127 adjacent to each other in a peripheral direction. In addition, each track groove 129 of the inner joint member 123 has a ball raceway center line y, which is formed so as to be mirror-image symmetrical with the ball raceway center line x of the paired track groove 127 of the outer joint member 122 with respect to a plane P including a joint center O at the operating angle of 0°.

In the vertical cross section illustrated in FIG. 25, each track groove 127 formed in a spherical inner peripheral surface 126 of the outer joint member 122 extends into an arc shape along the axial direction, and a curvature center of the track groove 127 is positioned at the joint center O. Each track groove 129 formed in a spherical outer peripheral surface 128 of the inner joint member 123 so as to be opposed to the track groove 127 of the outer joint member 122 extends into an arc shape along the axial direction, and a curvature center of the track groove 129 is positioned at the joint center O. Eight balls 124 for transmitting torque are interposed in crossing portions between the track grooves 127 of the outer joint member 122 and the track grooves 129 of the inner joint member 123. The cage 125 for holding the balls 124 is arranged between the spherical inner peripheral surface 126 of the outer joint member 122 and the spherical outer peripheral surface 128 of the inner joint member 123. The cage 125 has a spherical outer peripheral surface 132 fitted to the spherical inner peripheral surface 126 of the outer joint member 122, and a spherical inner peripheral surface 133 fitted to the spherical outer peripheral surface 128 of the inner joint member 123. The spherical outer peripheral surface 132 and the spherical inner peripheral surface 133 each have a curvature center formed at the joint center O. In the constant velocity universal joint 121, curvature centers of the ball raceway center lines x and y of the track grooves 127 and 129 of the outer joint member 122 and the inner joint member 123 are not offset in the axial direction with respect to the joint center O. However, the inclined opposed track grooves 127 and 129 cross each other, and the balls 124 are interposed in those crossing portions. Therefore, when the joint forms an operating angle, the balls 124 are always guided in a plane bisecting an angle formed between axial lines of the outer joint member 122 and the inner joint member 123. As a result, rotational torque is transmitted at a constant velocity between the two axes.

In the above-mentioned fixed type constant velocity universal joint 121 of the track groove crossing type, the track grooves 127 of the outer joint member 122 that are adjacent to each other in the peripheral direction are inclined in the opposite directions. Further, the track grooves 129 of the inner joint member 123 that are adjacent to each other in the peripheral direction are inclined in the opposite directions. Therefore, forces in the opposite directions are applied from the balls 124 to pocket portions 125a of the cage 125 that are adjacent to each other in the peripheral direction. Due to the forces in the opposite directions, the cage 125 is stabilized at the position of the joint center O. Thus, a contact force between the spherical outer peripheral surface 132 of the cage 125 and the spherical inner peripheral surface 126 of the outer joint member 122, and a contact force between the spherical inner peripheral surface 133 of the cage 125 and the spherical outer peripheral surface 128 of the inner joint member 123 are suppressed. Accordingly, the joint is smoothly operated under high load and in high speed rotation. As a result, torque loss and heat generation are suppressed, and the durability is enhanced.

The above-mentioned fixed type constant velocity universal joint 121 is excellent as a joint suppressed in heat generation, but has the following problem inherent therein. Detailed description is given of the problem with reference to FIG. 26. FIG. 26a illustrates a state in which the above-mentioned constant velocity universal joint forms a high operating angle, and FIG. 26b illustrates a positional relationship between the track groove 127 of the outer joint member 122 and the ball 124 on an enlarged scale. As illustrated in FIG. 26a, when the joint forms a high operating angle θ, a center Ob of the ball 124 moves to a position of θ/2 with respect to the plane P including the joint center O at the operating angle of 0°. The ball 124 and the track groove 127 are held in angular contact at a contact angle, and hence a contact point between the ball 124 and the track groove 127 is positioned on the broken line in FIG. 26b. In addition, in the axial direction, the contact point between the ball 124 and the track groove 127 is positioned in a plane t that passes through the center Ob of the ball 124 and is orthogonal to the ball raceway center line x. In the above-mentioned fixed type constant velocity universal joint 121, when a large inlet chamfer 130 is formed in the outer joint member 122, the ball 124 comes to a position on an outside of the inlet chamfer 130 at a high operating angle θ, and may drop off the track groove 127. This is because the effective track length becomes insufficient. Specifically, the curvature center of the arc-shaped track groove 127 and the joint center O match with each other, and hence an axial distance w between the center Ob of the ball 124 and a contact point s is large. As a result, there arises a problem that high operating angles cannot be formed.

Problems to be Solved by the Invention

In view of the above-mentioned problem with the related art, the inventors have investigated the possibility of forming the track grooves into a linear shape on the opening side with respect to the joint center O so as to achieve high operating angles in the fixed type constant velocity universal joint of the track groove crossing type as disclosed in JP 2009-250365 A. FIGS. 21 illustrate this constant velocity universal joint. FIG. 21a is a vertical sectional view, and FIG. 21b is a right-hand side view of FIG. 21a. As illustrated in FIG. 21a, in a constant velocity universal joint 141, track grooves 147 and 149 of an outer joint member 142 and an inner joint member 143 are of a crossing type. Each track groove 147 of the outer joint member 142 includes a track groove portion 147a having an arc-shaped ball raceway center line xa about a curvature center at the joint center O on an interior side with respect to the joint center O, and a track groove portion 147b having a linear ball raceway center line xb on an opening side with respect to the joint center O. On the other hand, each track groove 149 of the inner joint member 143 includes a track groove portion 149b having a linear ball raceway center line yb on the interior side with respect to the joint center O, and a track groove portion 149a having an arc-shaped ball raceway center line ya about a curvature center at the joint center O on the opening side with respect to the joint center O.

In addition, as illustrated in FIG. 21b, the track grooves 147 include track grooves 147A and 147B that are inclined in a peripheral direction with respect to a joint axial line and adjacent to each other in the peripheral direction with their inclination directions opposite to each other. Further, the track grooves 149 include track grooves 149A and 149B that are inclined in the peripheral direction with respect to the joint axial line and adjacent to each other in the peripheral direction with their inclination directions opposite to each other. Balls 144 are arranged in crossing portions of the paired track grooves 147A and 149A and the paired track grooves 147B and 149B of the outer joint member 142 and the inner joint member 143. Thus, when torque is transmitted at the operating angle of 0° as illustrated in FIGS. 21*a* and 21*b*, an opening direction of a wedge angle formed between the track grooves 147A and 149A and an opening direction of a wedge angle formed between the track grooves 147B and 149B become opposite to each other, and hence forces in the opposite directions are applied from the balls 144 to pocket portions 145*a* of a cage 145 that are adjacent to each other in the peripheral direction. With the forces in the opposite directions, the cage 145 is stabilized at the position of the joint center O. Thus, a contact force between a spherical outer peripheral surface 152 of the cage 145 and a spherical inner peripheral surface 146 of the outer joint member 142, and a contact force between a spherical inner peripheral surface 153 of the cage 145 and a spherical outer peripheral surface 148 of the inner joint member 143 are suppressed. Accordingly, the joint is smoothly operated under high load and in high speed rotation. As a result, torque loss and heat generation are suppressed, and the durability is enhanced.

As described above, in the track groove crossing type, the linear track groove portion 147*b* is formed on the opening side with respect to the joint center O in the track groove 147 of the outer joint member 142. With this, the effective track length can be increased. However, it has been found that, when a frequently used operating angle is formed, there is a problem in terms of suppression of the torque loss and heat generation of the joint. The reason is described with reference to FIG. 22. The track grooves 147 and 149 are generally held in contact with each ball 144 at a contact angle (approximately from 30° to 45°), and hence, as illustrated in FIG. 22, the track grooves 147 and 149 are held in contact with the ball 144 at positions indicated by the broken lines on side surface sides of the track grooves 147 and 149, which are slightly spaced apart from groove bottoms of the track grooves 147 and 149. When the joint forms an operating angle, wedge angle components (not shown) due to the crossing between the track grooves 147 and 149 and wedge angle components α due to expansion between the groove bottoms of the track grooves 147 and 149 in a radial direction of the joint are both applied to the balls 144. Of those wedge angle components, the wedge angle components due to the crossing between the track grooves 147 and 149 are canceled and forces are balanced because the track grooves 147 and 149 are inclined in the directions opposite to each other and hence forces in the opposite directions are applied from the balls 144 to the pocket portions 145*a* of the cage 145.

However, as illustrated in FIG. 22, in the case of the wedge angle components α due to the expansion between the groove bottoms of the track grooves 147 and 149 in the radial direction of the joint, the balls 144 within phase ranges of from 0° to 90° and from 270° to 360° in FIG. 21*b* are positioned between the linear track grooves 147*b* and 149*b*. Due to a wedge angle component α1 opened toward the opening side, a force toward the opening side is applied to the balls 144 within those phase ranges. On the other hand, the balls 144 within a phase range of from 90° to 270° are positioned between the arc-shaped track grooves 147*a* and 149*a*. Therefore, a wedge angle component α2, which is generated due to the expansion in the radial direction of the joint, is zero in the balls within this phase range, and hence no push-out force is generated in the balls 144. Thus, when the wedge angle components due to the crossing between the track grooves 147 and 149 and the wedge angle components α due to the expansion between the groove bottoms of the track grooves 147 and 149 in the radial direction of the joint are applied to the balls 144 in combination, the forces applied from the balls 144 to the pocket portions 145*a* of the cage 145 are not balanced with each other. As a result, there arises a problem in that the contact force to the spherical contact portions 152 and 146 of the cage 145 and the outer joint member 142, and the contact force to the spherical contact portions 153 and 148 of the cage 145 and the inner joint member 143 cannot be suppressed. In particular, it has been found that this problem is serious in terms of suppression of the torque loss and heat generation in a range of the frequently used operating angles including a normal angle.

Further, in the constant velocity universal joint 141 illustrated in FIGS. 21 and 22, the linear track groove portion 147*b* is formed parallel to a joint axial line n-n at the time of being projected onto a plane including the ball raceway center line x and the joint center O. On the other hand, the linear track groove portion 149*b* is formed parallel to the joint axial line n-n at the time of being projected onto a plane including the ball raceway center line y and the joint center O. Thus, when the joint forms a high operating angle, a wedge angle formed between the linear track groove portions 147*b* and 149*b* becomes higher. As a result, a pop-out force of the ball 144 sandwiched between the linear track groove portions 147*b* and 149*b* toward the opening side is increased. It has been found that the increased pop-out force causes an increase in pocket load of the cage 145, which causes a problem with the strength of the cage 145 at high operating angles.

Further, as illustrated in FIG. 24, in the related-art Rzeppa type constant velocity universal joint 101, when torque is applied, the ball 104 generates the force W for pushing the cage 105 to one side. With this, the inner joint member 103 and the cage 105 are held in contact with each other at the part I, and the outer joint member 102 and the cage 105 are held in contact with each other at the part J. As a result, friction loss occurs to cause a decrease in transmission efficiency. In addition to this problem in terms of the friction loss and transmission efficiency, the following problem arises.

Specifically, in the related-art Rzeppa type constant velocity universal joint 101, a pocket 105*a* of the cage 105 and the ball 104 are fitted with an interference fit so as to suppress deterioration in bending operability at the time of joint assembly (for example, approximately from −50 μm to −10 μm). This is because, when the pocket 105*a* and the ball 104 are fitted with a clearance fit, a degree of freedom of the ball 104 in displacement within the pocket 105*a* of the cage 105 is high. Synergistically, the pocket load W is generated only on one side. With this, a geometric restriction by the cage 105 on the bisecting plane is destabilized, and the bending operability is deteriorated. In this way, in the related-art constant velocity universal joint 101, the pocket 105*a* of the cage 105 and the ball 104 are fitted with the interference fit, and the friction loss increases to cause the problem of a decrease in transmission efficiency. Also in the above-mentioned constant velocity universal joint of the track groove crossing type illustrated in FIGS. 25 and 26, the problem with the fit between the pocket of the cage and the ball has not been focused on and has been unsolved.

Summary of the Invention

In view of the above-mentioned problems, the present invention has an object to provide a compact fixed type constant velocity universal joint that is suppressed in torque loss and heat generation, enhanced in efficiency, capable of forming high operating angles, and is excellent in strength and durability at the high operating angles.

Solutions to the Problems

As a result of various investigations for achieving the above-mentioned object, the inventors of the present invention have arrived at the following basic idea. In order to suppress torque loss and heat generation and to achieve higher efficiency, track grooves are formed to cross each other in a peripheral direction, arc-shaped first track groove portions are each formed to have a curvature center that is not offset in an axial direction with respect to a joint center so as to be adaptable to a range of frequently used operating angles, and second track groove portions are each formed into a different shape from that of the first track groove portions so as to increase an effective track length at a maximum operating angle and to be adaptable to a range of less frequently used high operating angles. In addition, the inventors of the present invention have arrived at such a novel idea of focusing on the problem with the fit between the pocket and the ball so as to achieve less torque loss and heat generation and thus achieve even higher efficiency. Further, in the process to arrive at the present invention, the inventors of the present invention have found out the following.

Specifically, the present invention is based on the following findings that are obtained through extensive investigations and tests.

(1) There is a precondition that the fixed type constant velocity universal joint of the track groove crossing type is structurally advantageous in that spherical contact between the cage and both the outer joint member and the inner joint member is suppressed, and hence the friction loss can be suppressed.

(2) Further, the pocket loads of the cage are alternately generated in the peripheral direction, and hence the geometric restriction by the cage on the bisecting plane is stabilized. As a result, a pocket clearance δ of the cage can be set on a positive clearance side.

(3) However, the following was verified. When the above-mentioned positive clearance, which had an upper limit, was excessively large, a degree of freedom of the ball in moving within the pocket of the cage was high. As a result, the cage was deviated from a position in the bisecting plane, and in some cases, the bending operability was decreased.

According to one embodiment of the present invention, as a technical solution for achieving the above-mentioned object, there is provided a fixed type constant velocity universal joint, comprising: an outer joint member having a spherical inner peripheral surface in which a plurality of track grooves are formed so as to extend in an axial direction of the outer joint member, the outer joint member having an opening side and an interior side spaced apart from each other in the axial direction; an inner joint member having a spherical outer peripheral surface in which a plurality of track grooves are formed so as to be paired with the plurality of track grooves of the outer joint member; a plurality of balls for transmitting torque, the plurality of balls being interposed between the plurality of track grooves of the outer joint member and the plurality of track grooves of the inner joint member; and a cage comprising pockets for receiving the plurality of balls, the cage having a spherical outer peripheral surface and a spherical inner peripheral surface, which are fitted to the spherical inner peripheral surface of the outer joint member and the spherical outer peripheral surface of the inner joint member, respectively, wherein the plurality of track grooves of the outer joint member comprise: first track groove portions 7a positioned on the interior side; and second track groove portions 7b positioned on the opening side, wherein each of the first track groove portions 7a comprises an arc part having a curvature center that is positioned without being offset in the axial direction with respect to a joint center O, wherein the first track groove portions 7a are inclined in a peripheral direction of the outer joint member with respect to a joint axial line N-N and adjacent to each other in the peripheral direction with their inclination directions opposite to each other, wherein each of the second track groove portions 7b is formed into a different shape from a shape of the each of the first track groove portions 7a so as to increase an effective track length at a maximum operating angle, wherein the each of the first track groove portions 7a and the each of the second track groove portions 7b are connected to each other at a position on the opening side with respect to the joint center O, wherein each of the plurality of track grooves of the inner joint member is formed so as to be mirror-image symmetrical with corresponding one of the plurality of paired track grooves of the outer joint member with respect to a plane P including the joint center O at an operating angle of 0°, and wherein a pocket clearance δ is set within a range in which the plurality of balls and the pockets of the cage are fitted with both an interference fit and a clearance fit. Note that, the above-mentioned joint axial line refers to a longitudinal axial line that is a joint rotation center, and corresponds to a joint axial line N-N in the embodiments described later. The same applies to the joint axial line described in the scope of claims.

With the above-mentioned structure, it is possible to attain a fixed type constant velocity universal joint that is suppressed in torque loss and heat generation, markedly enhanced in efficiency, has a prolonged life due to the less heat generation, and is compactified. The fixed type constant velocity universal joint is also capable of forming high operating angles, and excellent in strength and durability at the high operating angles.

Specifically, it is desired that the pocket clearance δ be set within a range of $-30~\mu m \leq \delta \leq 40~\mu m$. With this, less torque loss and heat generation, and higher efficiency can be achieved. In addition, the problem with the bending operability at the time of assembly of the joint can be solved. How the problem with the bending operability can be solved is described later. Note that, when rattling noise of the plurality of balls in the pockets may occur as the pocket clearance δ becomes larger on the positive clearance side, an upper limit of the pocket clearance δ may be appropriately decreased. Also in terms of this, in order to achieve less torque loss and heat generation, and even higher efficiency, it is desired that the pocket clearance δ be set within a range of $-10~\mu m \leq \delta \leq 20~\mu m$.

Note that, when assuming that H represents an axial dimension of the pocket, and Db represents a diameter of a ball 4 (see FIG. 6), the pocket clearance 6 is represented by the following expression.

Pocket clearance δ=Axial dimension $H$ of pocket of cage–diameter $Db$ of ball

Thus, when the diameter Db of the ball is larger than the axial dimension H of the pocket, a negative clearance is formed. On the other hand, when the diameter Db of the ball is smaller than the axial dimension H of the pocket, a positive clearance is formed.

Further, in this specification and the scope of claims, the description that the pocket clearance δ is set within the range in which the plurality of balls and the pockets of the cage are fitted with both the interference fit and the clearance fit can also be interpreted that the pocket clearance δ is set within a range in which both the above-mentioned positive clearance and negative clearance are formed.

With regard to the structure of the track grooves, when assuming that an angle formed by a straight line L connecting the joint center O and a connection point between the each of the above-mentioned first track groove portions 7a and the each of the above-mentioned second track groove portions 7b with respect to the plane P including the joint center O at the operating angle of 0° is represented by β, the angle β may be set appropriately depending on use conditions and the like. Considering the range of the normal operating angle of the constant velocity universal joint for an automobile, the angle β is set to 3° to 10°, and thus the constant velocity universal joint is widely applicable to various vehicle types. Note that, the angle β is herein defined as the smallest angle among the angles formed by the above-mentioned straight line L with respect to a straight line on the above-mentioned plane P, and the same applies to the embodiments and the scope of claims.

When the curvature center of the arc part of the each of the above-mentioned first track groove portions 7a is arranged on the joint axial line N-N, track groove depths can be equalized, and processes thereon can be simplified. Further, when the curvature center of the arc part of the each of the above-mentioned first track groove portions 7a is offset in a radial direction with respect to the joint axial line N-N, track groove depths on the interior side of the joint can be adjusted, with the result that optimum track groove depths can be secured.

The each of the above-mentioned second track groove portions 7b comprises an arc part. Further, the arc part of the each of the second track groove portions 7b has a curvature center offset to a radially outer side with respect to the each of the first track groove portions 7a and offset to the opening side with respect to the joint center O. With this, compactification can be achieved, and the effective track length can be increased. As a result, the maximum operating angle can be increased.

In addition, the each of the above-mentioned second track groove portions 7b comprises a linear part, and the linear part is formed with an inclination so as to come closer to the joint axial line N-N as a distance to the opening side becomes smaller. In this case, sizes of wedge angles formed between the linear track grooves at high operating angles can be decreased, and hence the strength of the cage can be secured.

The number of balls for transmitting torque is set to eight or ten. With this structure, it is possible to attain a fixed type constant velocity universal joint and therefore an automotive drive shaft that are lightweight and compact, enhanced in efficiency, and are capable of forming high operating angles.

Effects of the Invention

According to the one embodiment of the present invention, it is possible to attain the fixed type constant velocity universal joint that is suppressed in torque loss and heat generation, markedly enhanced in efficiency, has a prolonged life due to the less heat generation, and is compactified. The fixed type constant velocity universal joint is also capable of forming high operating angles, and excellent in strength and durability at the high operating angles.

BRIEF DESCRIPTION OF DRAWINGS

FIG. 1a is a partial vertical sectional view of a fixed type constant velocity universal joint according to a first embodiment of the present invention.

FIG. 1b is a right-hand side view of the fixed type constant velocity universal joint according to the first embodiment of the present invention.

FIG. 8a is a perspective view of the outer joint member.

FIG. 8b is a perspective view of the inner joint member.

FIG. 17b is a main-part enlarged view of FIG. 17a.

FIG. 18a is a view of a wedge angle under the state in which the joint forms the maximum operating angle.

FIG. 18b is a view illustrating a variation of the wedge angle of FIG. 18a.

FIG. 19a is a perspective view of the inner joint member.

FIG. 19b is a perspective view of the inner joint member.

FIG. 21b is a right-hand side view of the fixed type constant velocity universal joint of

FIG. 21a.

FIG. 26b is an enlarged view of a main part of FIG. 26a.

EMBODIMENTS OF THE INVENTION

Embodiments of the present invention are described with reference to FIGS. 1 to 20.

Figure 2B:
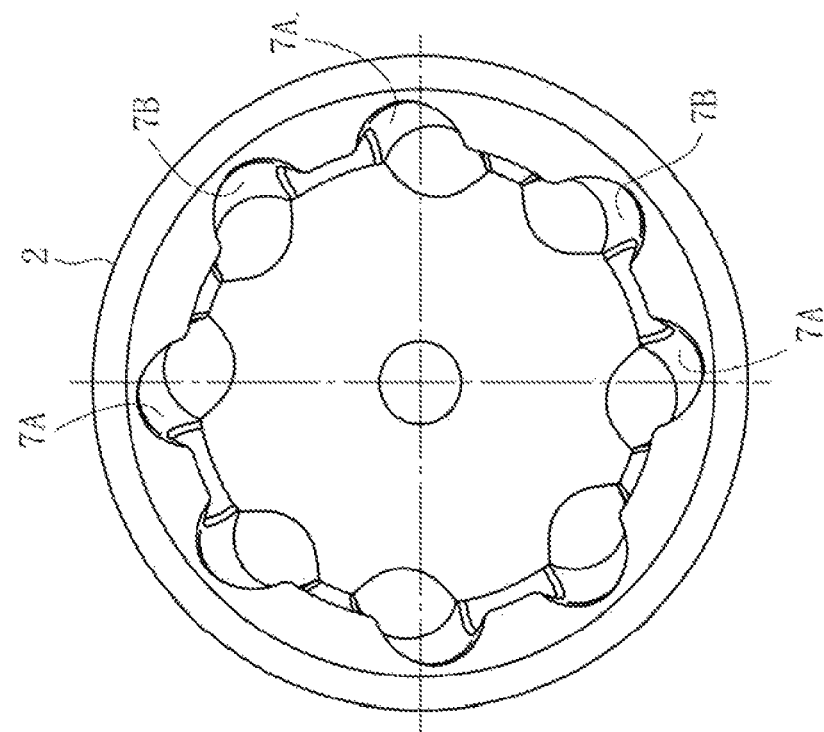
FIG. 2b is a right-hand side view of the outer joint member of the fixed type constant velocity universal joint of FIGS. 1a and 1b.
Figure 2A:
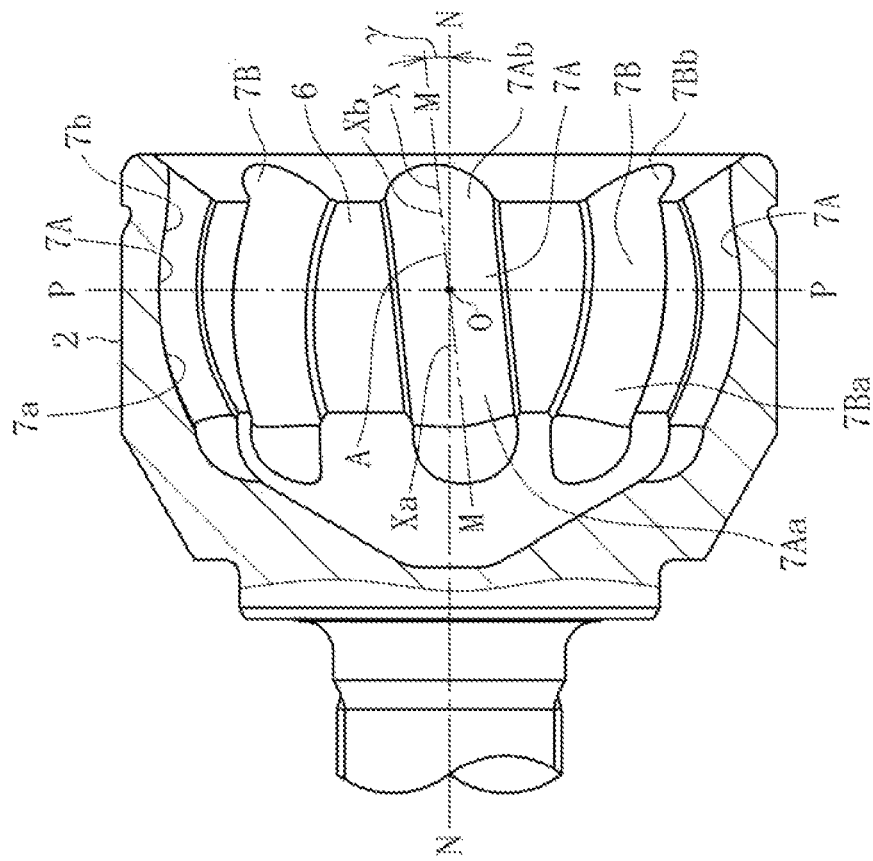
FIG. 2a is a partial vertical sectional view of an outer joint member of the fixed type constant velocity universal joint of FIGS. 1a and 1b.
Figure 3A:
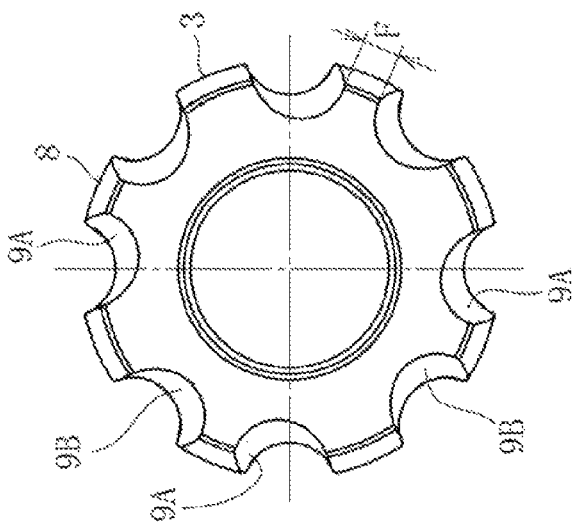
FIG. 3a is a left-hand side view of an inner joint member of the fixed type constant velocity universal joint of FIGS. 1a and 1b.
Figure 3B:
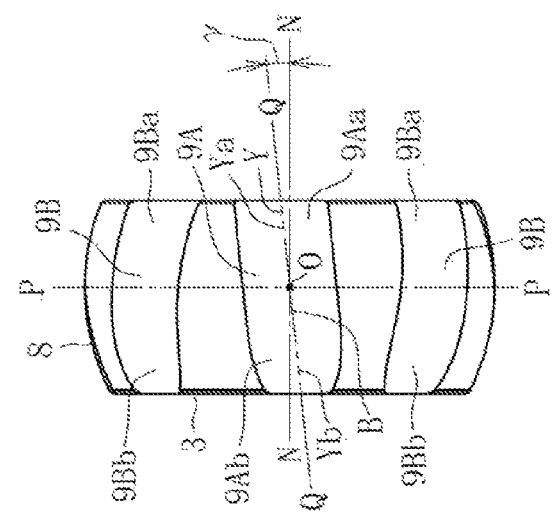
FIG. 3b is a view of an outer peripheral surface of the inner joint member of the fixed type constant velocity universal joint of FIGS. 1a and 1b.

FIGS. 1 to 9 illustrate a first embodiment of the present invention. FIG. 1 illustrate a fixed type constant velocity universal joint according to the first embodiment. FIG. 1a is a partial vertical sectional view, and FIG. 1b is a right-hand side view of FIG. 1a. The constant velocity universal joint 1 mainly comprises an outer joint member 2, an inner joint member 3, balls 4, and a cage 5. As illustrated in FIGS. 1b, 2, and 3, respective eight track grooves 7 and 9 of the outer joint member 2 and the inner joint member 3 respectively comprise track grooves 7A and 7B and track grooves 9A and 9B that are inclined in a peripheral direction with respect to a joint axial line N-N and adjacent to each other in the peripheral direction with their inclination directions opposite to each other. Eight balls 4 are arranged in crossing portions of the paired track grooves 7A and 9A and the paired track grooves 7B and 9B of the outer joint member 2 and the inner joint member 3. FIG. 1a illustrates the track grooves 7 and 9 under a state in which cross sections thereof in a plane M illustrated in FIG. 2a and a plane Q illustrated in FIG. 3b are rotated at an inclination angle γ of 0°. Details of this state are described later.

FIG. 1a illustrates a vertical cross section of the joint. The term "ball raceway center line" is used herein for description to accurately describe the form, such as an inclined state and a curved state, and the shape of the track grooves extending in the axial direction. The ball raceway center line herein refers to a trajectory of the center of the ball arranged between the track grooves at the time of moving along the track grooves. Thus, the inclined state of the track grooves corresponds to an inclined state of the ball raceway center lines, and an arc-shaped state or a linear state of the track grooves correspond to an arc-shaped state or a linear state of the ball raceway center lines.

As illustrated in FIG. 1a, each track groove 7 of the outer joint member 2 has a ball raceway center line X. The track groove 7 comprises a first track groove portion 7a having an arc-shaped ball raceway center line Xa about a curvature center at a joint center O, and a second track groove portion 7b having an arc-shaped ball raceway center line Xb curved in an opposite direction to that of the first track groove portion 7a. The ball raceway center line Xb of the second track groove portion 7b is smoothly connected to the ball raceway center line Xa of the first track groove portion 7a. On the other hand, each track groove 9 of the inner joint member 3 has a ball raceway center line Y. The track groove 9 comprises a first track groove portion 9a having an arc-shaped ball raceway center line Ya about a curvature center at the joint center O, and a second track groove portion 9b having an arc-shaped ball raceway center line Yb curved in an opposite direction to that of the first track groove portion 9a. The ball raceway center line Yb of the second track groove portion 9b is smoothly connected to the ball raceway center line Ya of the first track groove portion 9a. In this way, the ball raceway center lines Xa and Ya of the first track groove portions 7a and 9a have different shapes from the ball raceway center lines Xb and Yb of the second track groove portions 7b and 9b, respectively.

The curvature centers of the ball raceway center lines Xa and Ya of the first track groove portions 7a and 9a are arranged at the joint center O, that is, on the joint axial line N-N. Thus, track groove depths can be equalized, and processes thereon can be simplified.

Although illustration is omitted, the track grooves 7 and 9 are formed into an elliptical shape or a Gothic arch shape in horizontal cross section, and the track grooves 7 and 9 are held in so-called angular contact with each ball 4 at a contact angle (approximately from 30° to 45°). Thus, the ball 4 is held in contact with the track grooves 7 and 9 on their side surface sides, which are slightly spaced apart from groove bottoms of the track grooves 7 and 9.

Referring to FIG. 2, description is given of a state in which the track grooves 7 of the outer joint member 2 are inclined in the peripheral direction with respect to the joint axial line N-N. FIG. 2a is a partial vertical sectional view of the outer joint member 2, and FIG. 2b is a right-hand side view of the outer joint member 2. The track grooves 7 of the outer joint member 2 are represented by the reference symbols 7A and 7B to indicate a difference in inclination direction thereof. As illustrated in FIG. 2a, the plane M including the ball raceway center line X of each track groove 7A and the joint center O is inclined at the angle γ with respect to the joint axial line N-N. In addition, with regard to each track groove 7B adjacent to the track groove 7A in the peripheral direction, although illustration is omitted, another plane M including the ball raceway center line X of the track groove 7B and the joint center O is inclined at the angle γ with respect to the joint axial line N-N in an opposite direction to the inclination direction of the track groove 7A. In this embodiment, the entire ball raceway center line X of the track groove 7A, that is, both the ball raceway center line Xa of the first track groove portion 7a and the ball raceway center line Xb of the second track groove portion 7b are formed in the plane M. However, the present invention is not limited thereto, and there may be carried out such an embodiment that only the ball raceway center line Xa of the first track groove portion 7a is included in the plane M. Thus, it is only necessary that the planes M including at least the ball raceway center line Xa of the first track groove portion 7a and the joint center O be inclined in the peripheral direction with respect to the joint axial line N-N with their inclination directions opposite to each other in the first track groove portions 7a adjacent to each other in the peripheral direction.

Now, supplementary description is given of the reference symbols of the track grooves. Reference symbol 7 represents the track grooves of the outer joint member 2 as a whole, and reference symbols 7a and 7b represent the first and second track groove portions. When the track grooves having different inclination directions are to be distinguished from each other, the track grooves are represented by reference symbols 7A and 7B. Further, reference symbols 7Aa and 7Ba represent first track groove portions of the respective track grooves 7A and 7B, and reference symbols 7Ab and 7Bb represent second track groove portions of the respective track grooves 7A and 7B. The track grooves of the inner joint member 3 described later are represented by the reference symbols in a similar manner.

Figure 3C:
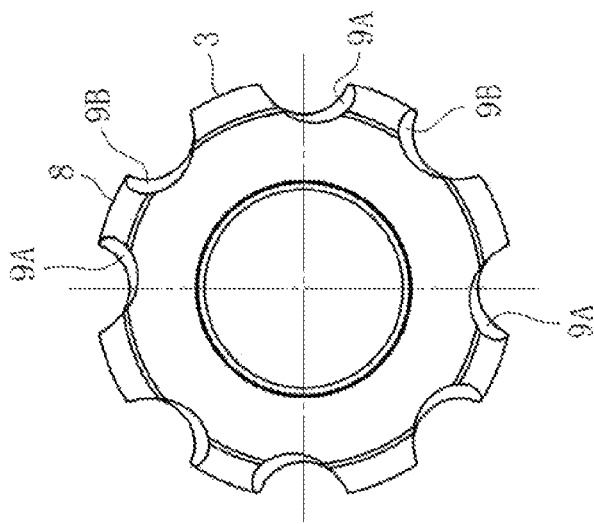
FIG. 3c is a right-hand side view of the inner joint member of the fixed type constant velocity universal joint of FIGS. 1a and 1b.

Next, referring to FIG. 3, description is given of a state in which the track grooves 9 of the inner joint member 3 are inclined in the peripheral direction with respect to the joint axial line N-N. FIG. 3b illustrates an outer peripheral surface of the inner joint member 3, FIG. 3a is a left-hand side view of the inner joint member 3, and FIG. 3c is a right-hand side view of the inner joint member 3. The track grooves 9 of the inner joint member 3 are represented by the reference symbols 9A and 9B to indicate a difference in inclination direction thereof. As illustrated in FIG. 3b, the plane Q including the ball raceway center line Y of each track groove 9A and the joint center O is inclined at the angle γ with respect to the joint axial line N-N. In addition, with regard to each track groove 9B adjacent to the track groove 9A in the peripheral direction, although illustration is omitted, another plane Q including the ball raceway center line Y of the track groove 9B and the joint center O is inclined at the angle γ with respect to the joint axial line N-N in an opposite direction to the inclination direction of the track groove 9A. The inclination angle γ is preferably in a range of from 4° to 12° in consideration of operability of the constant velocity universal joint 1 and a spherical width F between the closest sides of the track grooves of the inner joint member 3.

Similarly to the outer joint member described above, in this embodiment, the entire ball raceway center line Y of the track groove 9A, that is, both the ball raceway center line Ya of the first track groove portion 9a and the ball raceway center line Yb of the second track groove portion 9b are formed in the plane Q. However, the present invention is not limited thereto, and may be carried out in such an embodiment that only the ball raceway center line Ya of the first track groove portion 9a is included in the plane Q. Therefore, it is only necessary that the planes Q including at least the ball raceway center line Ya of the first track groove portion 9a and the joint center O be inclined in the peripheral direction with respect to the joint axial line N-N with their inclination directions opposite to each other in the first track groove portions 9a adjacent to each other in the peripheral direction. The ball raceway center line Y of the track groove 9 of the inner joint member 3 is formed so as to be mirror-image symmetrical with the ball raceway center line X of the paired track groove 7 of the outer joint member 2 with respect to a plane P including the joint center O and being perpendicular to the joint axial line N-N at an operating angle of 0°.

Figure 4:
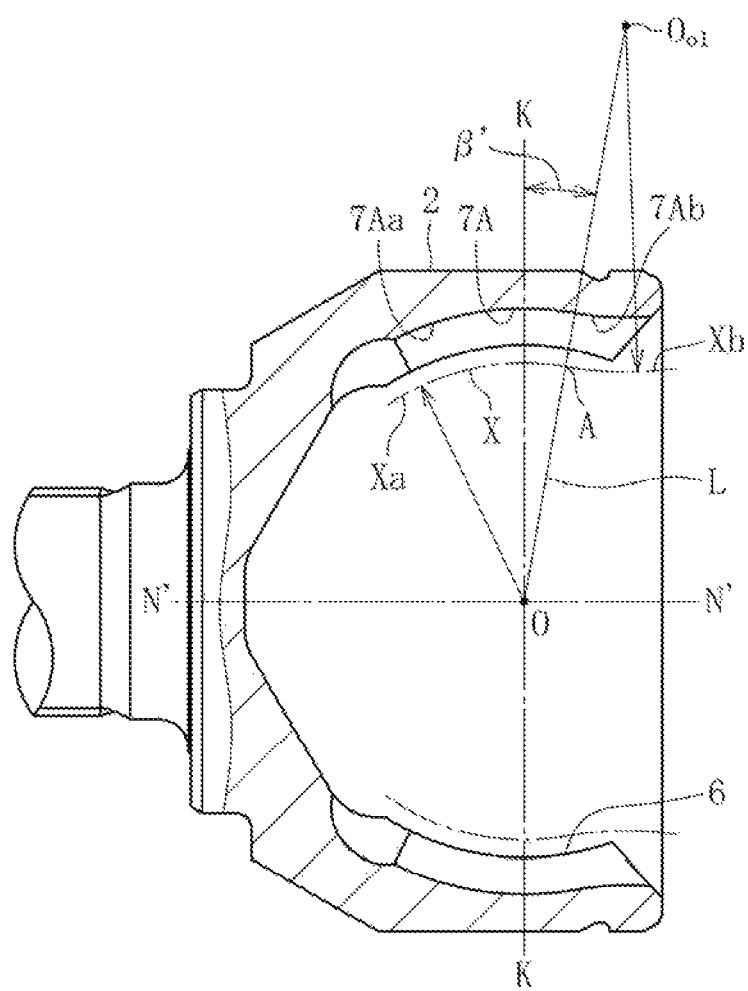
FIG. 4 is a partial vertical sectional view of details of track grooves of the outer joint member.

Referring to FIG. 4, detailed description is given of the track grooves in the vertical cross section of the outer joint member 2. FIG. 4 is a sectional view of a partial vertical cross section taken along the above-mentioned plane M of FIG. 2a, which includes the ball raceway center line X of the track groove 7A and the joint center O. Thus, to be strict, FIG. 4 is not a vertical sectional view in the plane including the joint axial line N-N, but illustrates a cross section inclined at the angle γ. FIG. 4 illustrates the track groove 7A of the outer joint member 2. Detailed description of the track groove 7B is omitted because the inclination direction of the track groove 7B is merely opposite to that of the track groove 7A and other structural details of the track groove 7B are the same as those of the track groove 7A.

As illustrated in FIG. 4, in a spherical inner peripheral surface 6 of the outer joint member 2, the track grooves 7A are formed along the axial direction. Each track groove 7A has the ball raceway center line X, and comprises the first track groove portion 7Aa having the arc-shaped ball raceway center line Xa about the curvature center at the joint center O (not offset in the axial direction), and the second track groove portion 7Ab having the arc-shaped ball raceway center line Xb about the curvature center at a point $O_{o1}$ offset from the joint center O to the opening side in the axial direction on a radially outer side of the ball raceway center line Xa of the first track groove portion 7Aa (that is, radially outer side of the first track groove portion 7Aa). Thus, the arc-shaped ball raceway center line Xb of the second track groove portion 7Ab is curved in an opposite direction to that of the arc-shaped ball raceway center line Xa of the first track groove portion 7Aa. An end portion A on the opening side of the ball raceway center line Xa of the first track groove portion 7Aa is a point at which a straight line connecting the joint center O and the offset point $O_{o1}$ crosses the ball raceway center line X, and L represents a straight line connecting the end portion A and the joint center O. The ball raceway center line Xb of the second track groove portion 7Ab is smoothly connected to the end portion A. That is, the end portion A is a connecting point between the first track groove portion 7Aa and the second track groove portion 7Ab.

As illustrated in FIG. 4, an angle β' formed between the straight line L and a perpendicular line K at the joint center O, which is perpendicular to the joint axial line N'-N' projected onto the plane M (see FIG. 2a) including the ball raceway center line X of the track groove 7A and the joint center O, is inclined at the angle γ with respect to the joint axial line N-N. The above-mentioned perpendicular line K is formed in the plane P including the joint center O at the operating angle of 0°. Thus, in the present invention, an angle β formed by the straight line L with respect to the plane P including the joint center O at the operating angle of 0° satisfies a relationship of $\sin \beta = \sin \beta' \times \cos \gamma$. Each of the above-mentioned first track groove portion 7Aa and the above-mentioned second track groove portion 7Ab of the outer joint member 2 is formed of a single arc, but the present invention is not limited thereto. The first track groove portion 7Aa and the second track groove portion 7Ab may be formed of a plurality of arcs in consideration of the track groove depths and the like.

Figure 5:
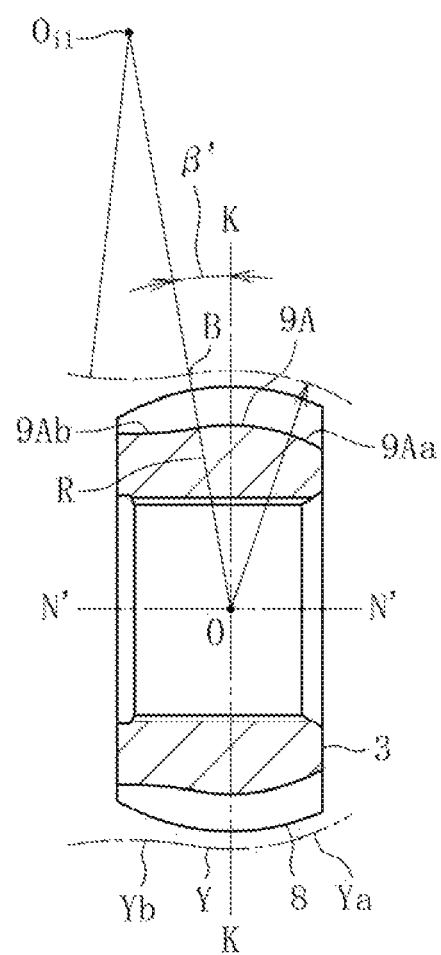
FIG. 5 is a vertical sectional view of details of track grooves of the inner joint member.

Similarly, referring to FIG. 5, detailed description is given of the track grooves in the vertical cross section of the inner joint member 3. FIG. 5 is a sectional view of a vertical cross section taken along the above-mentioned plane Q of FIG.

3b, which includes the ball raceway center line Y of the track groove 9A and the joint center O. Thus, similarly to FIG. 4, to be strict, FIG. 5 is not a vertical sectional view in the plane including the joint axial line N-N, but illustrates a cross section inclined at the angle γ. FIG. 5 illustrates the track groove 9A of the inner joint member 3. Description of the track groove 9B is omitted because the inclination direction of the track groove 9B is merely opposite to that of the track groove 9A and other structural details of the track groove 9B are the same as those of the track groove 9A. In a spherical outer peripheral surface 8 of the inner joint member 3, the track grooves 9A are formed along the axial direction. Each track groove 9A has the ball raceway center line Y, and comprises the first track groove portion 9Aa having the arc-shaped ball raceway center line Ya about the curvature center at the joint center O (not offset in the axial direction), and the second track groove portion 9Ab having the arc-shaped ball raceway center line Yb about the curvature center at a point $O_{i1}$ offset from the joint center O to the interior side in the axial direction on a radially outer side of the first track groove portion 9Aa (that is, radially outer side of the first track groove portion 9Aa). An end portion B on the interior side of the first track groove portion 9Aa is a point at which a straight line connecting the joint center O and the offset point $O_{i1}$ crosses the ball raceway center line Y, and R represents a straight line connecting the end portion B and the joint center O. The ball raceway center line Yb of the second track groove portion 9Ab is smoothly connected to the end portion B. That is, the end portion B is a connecting point between the first track groove portion 9Aa and the second track groove portion 9Ab.

As illustrated in FIG. 5, an angle β' formed between the straight line R and a perpendicular line K at the joint center O, which is perpendicular to the joint axial line N'-N' projected onto the plane Q (see FIG. 3b) including the ball raceway center line Y of the track groove 9A and the joint center O, is inclined at the angle γ with respect to the joint axial line N-N. The above-mentioned perpendicular line K is formed in the plane P including the joint center O at the operating angle of 0°. Thus, an angle β formed by the straight line R with respect to the plane P including the joint center O at the operating angle of 0° satisfies a relationship of sin β=sin β'×cos γ. Similarly to the track grooves of the outer joint member 2 described above, each of the above-mentioned first track groove portion 9Aa and the above-mentioned second track groove portion 9Ab of the inner joint member 3 may be formed of a plurality of arcs in consideration of the track groove depths and the like.

Next, description is given of the angle β formed by each of the straight lines L and R with respect to the plane P including the joint center O at the operating angle of 0°. At an operating angle θ, each ball 4 moves by θ/2 with respect to the plane P including the joint center O in the outer joint member 2 and the inner joint member 3. The angle β is determined based on ½ of a frequently used operating angle, and a contact range of the track groove for the ball 4 is determined within a range of the frequently used operating angle. Now, the frequently used operating angle is defined. First, the normal angle of the joint refers to an operating angle to be formed in a fixed type constant velocity universal joint of a front drive shaft of an automobile with one person onboard when the steering of the automobile is switched to a straightforward mode on a horizontal and flat road surface. In general, the normal angle is selected and determined within a range of from 2° to 15° in accordance with design conditions for vehicle types. In addition, the frequently used operating angle refers to an operating angle to be formed in the fixed type constant velocity universal joint of the above-mentioned automobile during, for example, continuous travel on a curved road, instead of a high operating angle to be formed at the time of, for example, right and left turns at a traffic intersection. This operating angle is also determined in accordance with the design conditions for vehicle types. The frequently used operating angle is supposed to be 20° at maximum. Thus, the angle β formed by each of the straight lines L and R with respect to the plane P including the joint center O at the operating angle of 0° is set to 3° to 10°. Note that, the angle β is not limited to 3° to 10°, and may be set appropriately in accordance with the design conditions for vehicle types. When the angle β is set to 3° to 10°, the fixed type constant velocity universal joint of this embodiment is widely applicable to various vehicle types.

Due to the above-mentioned angle β, in FIG. 4, the end portion A of the ball raceway center line Xa of the first track groove portion 7Aa corresponds to a center position of the ball that is moved to the end of the opening side along the axial direction at the frequently used operating angle. Similarly, in the case of the inner joint member 3, in FIG. 5, the end portion B of the ball raceway center line Ya of the first track groove portion 9Aa corresponds to a center position of the ball that is moved to the end of the interior side along the axial direction at the frequently used operating angle. With this setting, within the range of the frequently used operating angles, the balls 4 are positioned between the first track groove portions 7Aa and 9Aa of the outer joint member 2 and the inner joint member 3 and the first track groove portions 7Ba and 9Ba that are inclined in the opposite directions to those of the first track groove portions 7Aa and 9Aa (see FIGS. 2 and 3). Therefore, forces in the opposite directions are applied from the balls 4 to pocket portions 5a of the cage 5 that are adjacent to each other in the peripheral direction. Therefore, the cage 5 is stabilized at the position of the joint center O (see FIG. 1). Thus, a contact force between a spherical outer peripheral surface 12 of the cage 5 and the spherical inner peripheral surface 6 of the outer joint member 2, and a contact force between a spherical inner peripheral surface 13 of the cage 5 and the spherical outer peripheral surface 8 of the inner joint member 3 are suppressed. Accordingly, the joint is smoothly operated under high load and in high speed rotation. As a result, torque loss and heat generation are suppressed, and the durability is enhanced.

Figure 6:
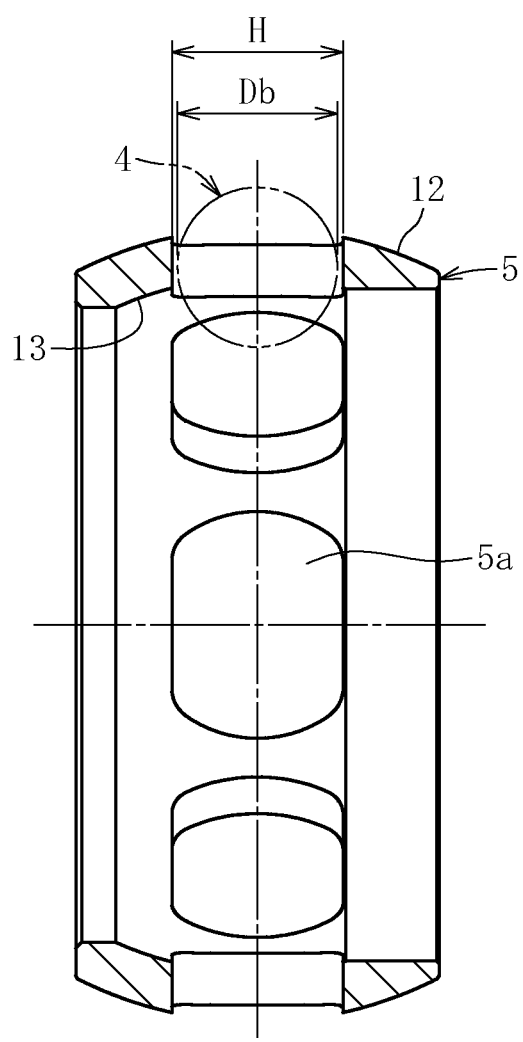
FIG. 6 is a vertical sectional view of a pocket clearance δ of a cage.

Next, description is given of conspicuous features of this embodiment, that is, further suppression of the torque loss and heat generation, and further enhancement of efficiency. FIG. 6 is a vertical sectional view of the cage, for illustrating a fitting state of the ball and the pocket of the cage. In the cage 5, eight pockets 5a are formed in the peripheral direction. Axially opposed surfaces of each pocket 5a are surfaces for holding the ball 4, and H represents an axial dimension between both the surfaces. In addition, when assuming that Db represents a diameter of the ball 4 indicated by the two-dot chain line, the pocket clearance δ is represented by the following expression.

Pocket clearance δ=Axial dimension $H$ of pocket of cage−diameter $Db$ of ball

Thus, when the diameter Db of the ball is larger than the axial dimension H of the pocket, a negative clearance is formed. On the other hand, when the diameter Db of the ball is smaller than the axial dimension H of the pocket, a positive clearance is formed.

In a related-art fixed type constant velocity universal joint, in view of problems with bending operability at the time of assembly, the balls and the pockets of the cage are fitted with an interference fit, that is, the pocket clearance is set as the negative clearance. However, in this embodiment, the pocket clearance δ is set within a range in which the balls 4 and the pockets 5a of the cage 5 are fitted with both an interference fit and a clearance fit. Results of evaluation tests demonstrated that, when the pocket clearance δ was set within a range of $-30$ μm≤δ≤40 μm, there were no problems with the bending operability at the time of joint assembly, and suppression of torque loss and heat generation and higher efficiency were successfully achieved. The reason is as follows. The track grooves of the fixed type constant velocity universal joint 1 according to this embodiment cross each other. Thus, even when the pocket clearance δ is set on a positive clearance side, pocket loads of the cage 5 are alternately generated in the peripheral direction and balanced with each other. With this, a geometric restriction by the cage 5 on the bisecting plane is stabilized. As a result, the decrease in the bending operability at the time of joint assembly is solved.

Note that, the bending operability herein refers to operability at the time when a shaft 11 (see FIG. 9) coupled to the inner joint member 3 is bent in a cross direction (diametrical direction) with respect to the outer joint member 2 under a state in which the fixed type constant velocity universal joint 1 is unloaded and not rotated (unloaded static state). When the bending operability is poor, the shaft is caught when being bent in the cross direction. As a result, the shaft cannot be smoothly bent, and in some cases, the shaft may not be bent.

Note that, when rattling noise of the ball 4 in the pocket 5a may occur during operation of the joint as the pocket clearance δ becomes larger on the positive clearance side, an upper limit of the pocket clearance δ may be appropriately decreased. Also in terms of this, in order to achieve less torque loss and heat generation, and even higher efficiency, it is desired that the pocket clearance δ be set within a range of $-10$ μm≤δ≤20 μm.

Further, also in terms of the bending operability, the following was verified. The above-mentioned positive clearance had an upper limit. When the clearance was excessively large, a degree of freedom of the ball 4 in moving within the pocket 5a of the cage 5 was high. As a result, the cage 5 was deviated from a position in the bisecting plane, and in some cases, the bending operability was decreased. The decrease in bending operability refers to the state in which the shaft 11 cannot be smoothly bent in the cross direction.

As described above, the fixed type constant velocity universal joint 1 according to this embodiment has a structural advantage of the crossing track grooves. Thus, spherical contact between the cage 5 and both the outer joint member 2 and the inner joint member 3 can be suppressed, and hence the effect of suppressing friction loss can be obtained. In addition, the pocket clearance δ is set within the range in which the balls 4 and the pockets 5a of the cage 5 are fitted with both the interference fit and the clearance fit, which provides additional effect of the further suppression of friction loss and heat generation. Even higher efficiency can be achieved synergistically by those effects. Further, due to less heat generation, a life of the joint is prolonged. Thus, it is no longer necessary to increase a capacity of the joint, with the result that the joint can be compactified.

The fitting state of the balls 4 and the pockets 5a of the cage 5 for further suppression of friction loss and heat generation, and the effects described above may be similarly obtained also in other embodiments described later.

Figure 7:
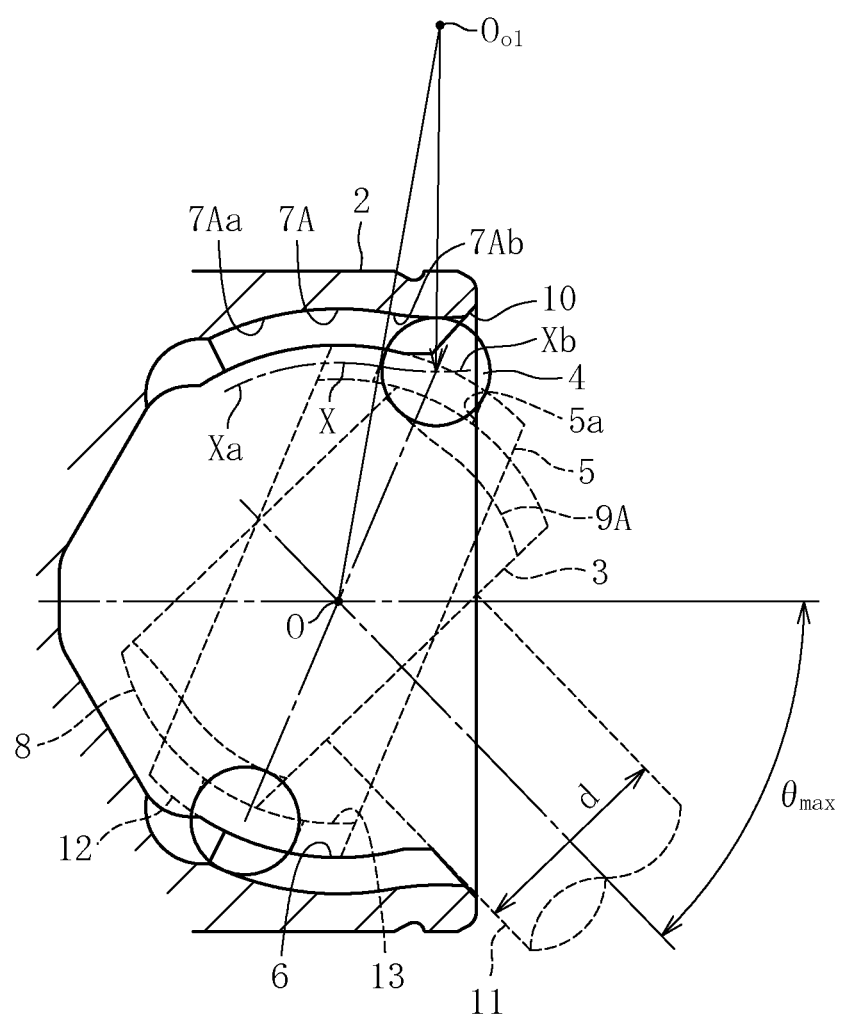
FIG. 7 is a schematic view of a state in which the joint forms a maximum operating angle.

FIG. 7 illustrates a state in which the constant velocity universal joint according to this embodiment forms a maximum operating angle. In the track groove 7A of the outer joint member 2, the second track groove portion 7Ab having the arc-shaped ball raceway center line Xb about the curvature center at the point $O_{o1}$ offset from the joint center O to the opening side in the axial direction on the radially outer side of the ball raceway center line Xa of the first track groove portion 7Aa is formed on the opening side. Irrespective of the compact design, by forming the second track groove portion 7Ab, the effective track length and the maximum operating angle can be increased. Thus, as illustrated in FIG. 7, even in a case where a maximum operating angle $\theta_{max}$ is set as high as approximately 50° and an inlet chamfer 10 having a necessary and sufficient size is formed, the ball 4 and the second track groove portion 7Ab can be reliably held in contact.

Note that, in a range of high operating angles, the balls 4 arranged in the peripheral direction are temporarily separately positioned between the first track groove portions 7Aa and 9Aa (7Ba and 9Ba, see FIGS. 2a and 3b) and between the second track groove portions 7Ab and 9Ab (7Bb and 9Bb, see FIGS. 2a and 3b). Along with this, the forces applied from the balls 4 to the pocket portions 5a of the cage 5 are not balanced with each other, and hence the contact forces are generated in the spherical contact portions 12 and 6 of the cage 5 and the outer joint member 2, and in the spherical contact portions 13 and 8 of the cage 5 and the inner joint member 3. However, the angles in the range of high operating angles are used less frequently. Thus, the constant velocity universal joint 1 according to this embodiment is comprehensively capable of suppressing the torque loss and heat generation. Thus, it is possible to attain a compact fixed type constant velocity universal joint that is suppressed in torque loss and heat generation, enhanced in efficiency, capable of forming high operating angles, and is excellent in strength and durability at the high operating angles.

FIG. 8 are perspective views of the outer joint member 2 and the inner joint member 3 of the constant velocity universal joint according to this embodiment. Those perspective views illustrate the above-mentioned track grooves in a three-dimensional manner. As illustrated in FIG. 8a, the track grooves 7A and 7B inclined in the peripheral direction with respect to the joint axial line N-N (not shown) are alternately formed in the spherical inner peripheral surface 6 of the outer joint member 2 with their inclination directions alternately opposite to each other. Each track groove 7A comprises the first track groove portion 7Aa and the second track groove portion 7Ab, and each track groove 7B comprises the first track groove portion 7Ba and the second track groove portion 7Bb. The inlet chamfer 10 is formed at an opening end of the outer joint member 2. Further, as illustrated in FIG. 8b, the track grooves 9A and 9B inclined in the peripheral direction with respect to the joint axial line N-N (not shown) are alternately formed in the spherical outer peripheral surface 8 of the inner joint member 3 with their inclination directions alternately opposite to each other. Each track groove 9A comprises the first track groove portion 9Aa and the second track groove portion 9Ab, and each track groove 9B comprises the first track groove portion 9Ba and the second track groove portion 9Bb.

Figure 9:
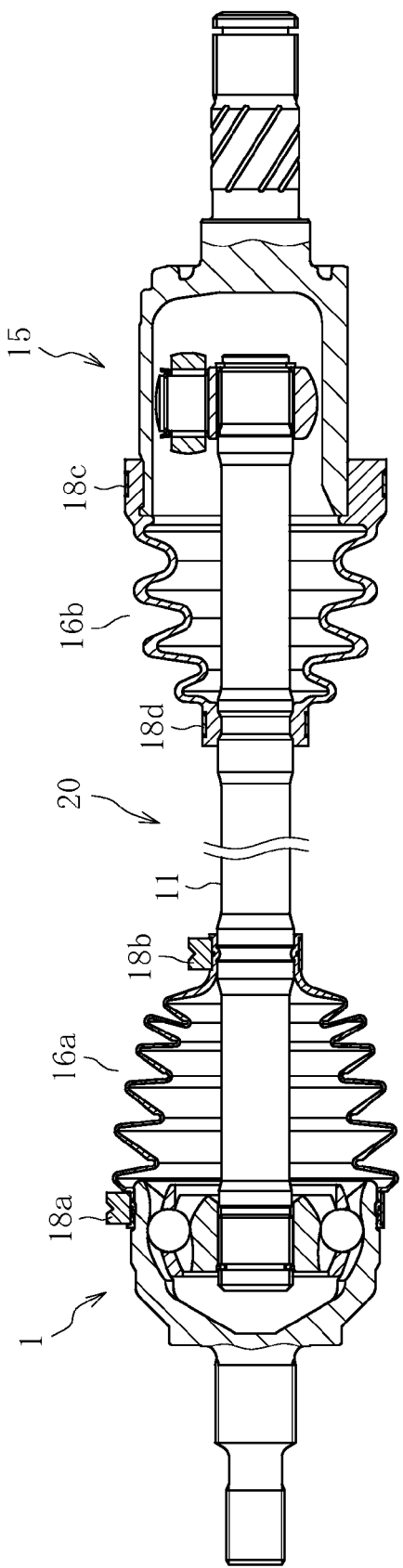
FIG. 9 is a view of a state in which the fixed type constant velocity universal joint of FIGS. 1a and 1b is used in an automotive drive shaft.

FIG. 9 illustrates an automotive front drive shaft 20, to which the fixed type constant velocity universal joint 1 according to this embodiment is applied. The fixed type constant velocity universal joint 1 is coupled to one end of an intermediate shaft 11, and a plunging tripod type constant velocity universal joint 15 is coupled to another end thereof. At positions between an outer peripheral surface of the fixed type constant velocity universal joint 1 and an outer peripheral surface of the shaft 11 and between an outer peripheral surface of the plunging tripod type constant velocity universal joint 15 and the outer peripheral surface of the shaft 11, bellows boots 16a and 16b are fastened and fixed with boot bands 18a, 18b, 18c, and 18d. Grease is sealed inside the joint as a lubricant. Through use of the fixed type constant velocity universal joint 1 according to this embodiment, it is possible to attain a lightweight and compact automotive drive shaft 20 that is suppressed in torque loss and heat generation, enhanced in efficiency, and is capable of forming high operating angles. When the drive shaft 20 is mounted to an automobile, this automobile is improved in transmission efficiency and suppressed in fuel consumption.

Figure 10:
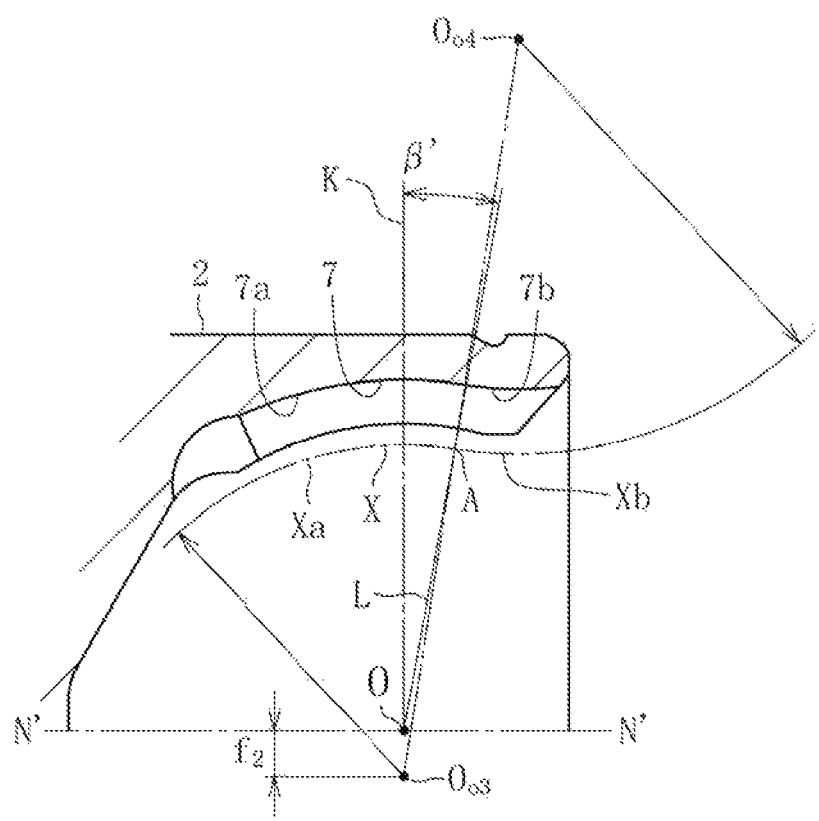
FIG. 10 is a vertical sectional view of an outer joint member of a fixed type constant velocity universal joint according to a second embodiment of the present invention.

Description is given of a fixed type constant velocity universal joint according to a second embodiment of the present invention with reference to FIG. 10. FIG. 10 is a sectional view similar to FIG. 4, for illustrating only an outer joint member of the fixed type constant velocity universal joint according to this embodiment. The fixed type constant velocity universal joint is different from the fixed type constant velocity universal joint according to the first embodiment described above in that the curvature centers of the arc-shaped ball raceway center lines of the first track groove portions are not offset in the axial direction with respect to the joint center O, but offset in the radial direction with respect to the joint axial line N-N, and that the structures of the arc-shaped ball raceway center lines of the second track groove portions are adjusted along with the above-mentioned offset. Other structural details are the same as those of the first embodiment. Also in this embodiment, parts having similar functions to those of the first embodiment are represented by the same reference symbols to omit redundant description thereof.

The end portion A on the opening side of the ball raceway center line Xa of the first track groove portion 7a of the outer joint member 2 is the same as that of the first embodiment. However, a curvature center $O_{o3}$ of the ball raceway center line Xa of the first track groove portion 7a is not offset in the axial direction with respect to the joint center O, but is offset by $f_2$ in the radial direction with respect to the joint axial line N-N. That is, the curvature center $O_{o3}$ is offset by $f_2$ in the radial direction in the plane P including the joint center O and the perpendicular line K at the operating angle of 0°. Along with this, a position of a curvature center $O_{o4}$ of the ball raceway center line Xb of the second track groove portion 7b is adjusted so that the ball raceway center line Xb is smoothly connected to the ball raceway center line Xa of the first track groove portion 7a. With this structure, track groove depths on the interior side of the joint can be adjusted. Although illustration is omitted, also in the fixed type constant velocity universal joint according to this embodiment, the ball raceway center line Y of the track groove 9 of the inner joint member 3 is formed so as to be mirror-image symmetrical with the ball raceway center line X of the paired track groove 7 of the outer joint member 2 with respect to the plane P including the joint center O at the operating angle of 0°. The inclined state in the peripheral direction of the track grooves 7 and 9 of the outer joint member 2 and the inner joint member 3 with respect to the joint axial line N-N, the effects by the cage and the joint, and the fitting state of the balls and the pockets of the cage and the effects thereby are the same as those in the fixed type constant velocity universal joint according to the first embodiment, and hence redundant description thereof is omitted.

FIGS. 11 to 19 illustrate a third embodiment of the present invention. A fixed type constant velocity universal joint according to this embodiment is different from the fixed type constant velocity universal joint according to the first embodiment in that the second track groove portions are formed into a linear shape. With this, at a maximum operating angle, the effective track length is secured, and formation of excessively high wedge angles is suppressed. Other structural details are the same as those of the first embodiment, and hence parts having similar functions are represented by the same reference symbols.

Figure 11A:
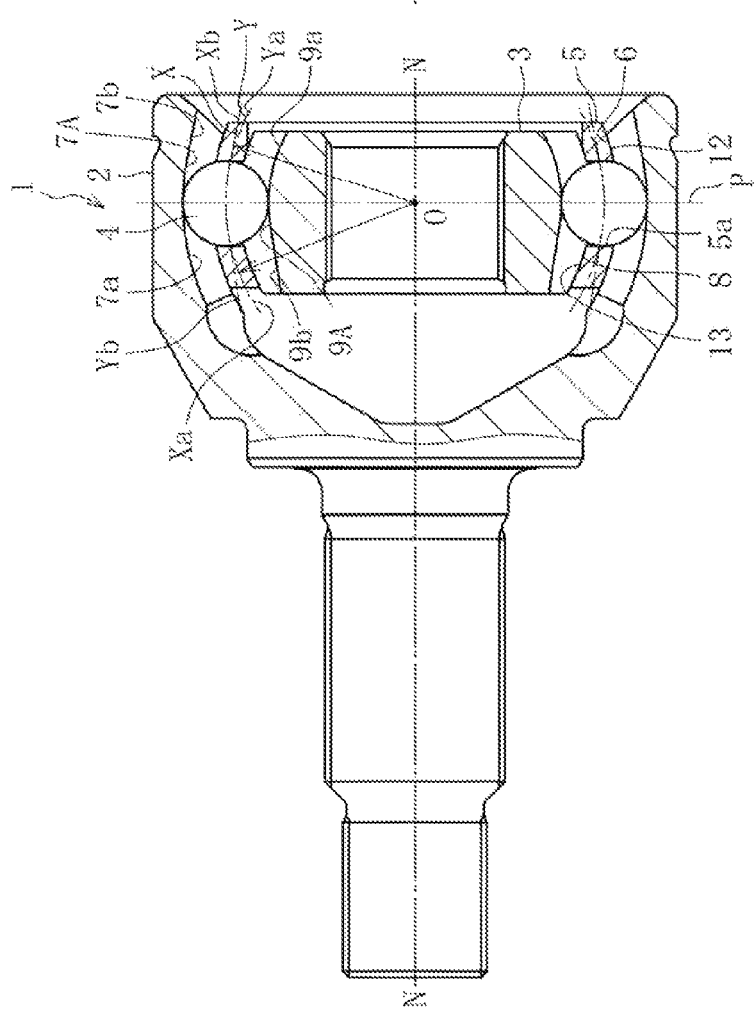
FIG. 11a is a partial vertical sectional view of a fixed type constant velocity universal joint according to a third embodiment of the present invention.
Figure 11B:
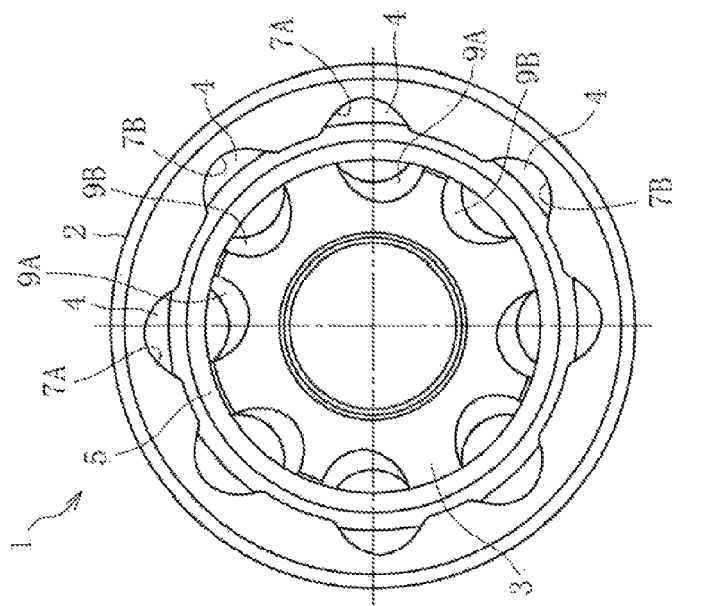
FIG. 11b is a right-hand side view of the fixed type constant velocity universal joint according to the third embodiment of the present invention.
Figure 12A:
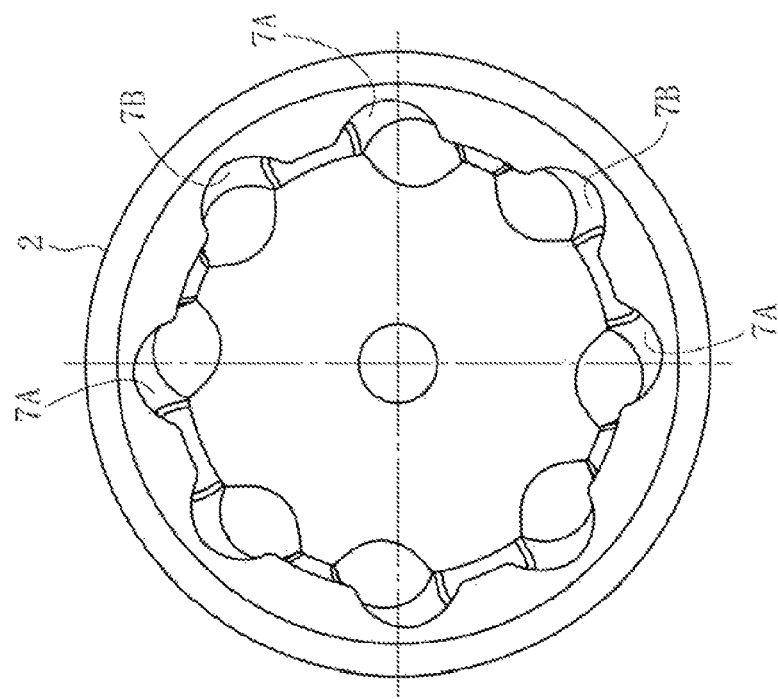
FIG. 12a is a partial vertical sectional view of an outer joint member of the fixed type constant velocity universal joint of FIGS. 11a and 11b.

FIG. 11 illustrate the fixed type constant velocity universal joint according to the first embodiment. FIG. 11a is a partial vertical sectional view, and FIG. 11b is a right-hand side view of FIG. 11a. The constant velocity universal joint 1 mainly comprises the outer joint member 2, the inner joint member 3, the balls 4, and the cage 5. As illustrated in FIGS. 11b, 12, and 13, respective eight track grooves 7 and 9 of the outer joint member 2 and the inner joint member 3 respectively comprise the track grooves 7A and 7B and the track grooves 9A and 9B that are inclined in the peripheral direction with respect to the joint axial line N-N and adjacent to each other in the peripheral direction with their inclination directions opposite to each other. Eight balls 4 are arranged in crossing portions of the paired track grooves 7A and 9A and the paired track grooves 7B and 9B of the outer joint member 2 and the inner joint member 3. FIG. 11a illustrates the track grooves 7 and 9 under a state in which cross sections thereof in the plane M illustrated in FIG. 12a and the plane Q illustrated in FIG. 13b are rotated at an inclination angle γ of 0°.

As illustrated in FIG. 11a, each track groove 7 of the outer joint member 2 has the ball raceway center line X. The track groove 7 comprises the first track groove portion 7a having an arc-shaped ball raceway center line Xa about a curvature center at the joint center O, and the second track groove portion 7b having a linear ball raceway center line Xb. The ball raceway center line Xb of the second track groove portion 7b is smoothly connected as a tangent to the ball raceway center line Xa of the first track groove portion 7a. On the other hand, each track groove 9 of the inner joint member 3 has the ball raceway center line Y. The track groove 9 comprises the first track groove portion 9a having an arc-shaped ball raceway center line Ya about a curvature center at the joint center O, and the second track groove portion 9b having a linear ball raceway center line Yb. The ball raceway center line Yb of the second track groove portion 9b is smoothly connected as a tangent to the ball raceway center line Ya of the first track groove portion 9a.

Figure 12B:
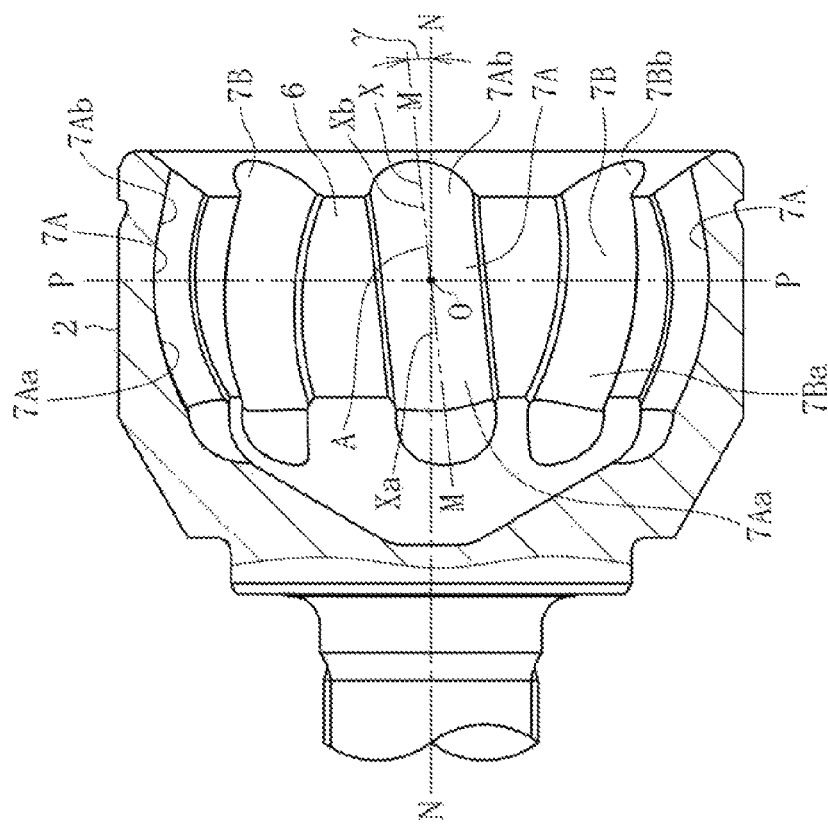
FIG. 12b is a right-hand side view of the outer joint member of the fixed type constant velocity universal joint of FIGS. 11a and 11b.

FIG. 12 illustrate a state in which the track grooves 7 of the outer joint member 2 are inclined in the peripheral direction with respect to the joint axial line N-N. FIG. 12a is a partial vertical sectional view of the outer joint member 2, and FIG. 12b is a right-hand side view of the outer joint member 2. The inclined state of the track grooves 7 of the outer joint member 2 is the same as that of the first embodiment, and hence redundant description thereof is omitted.

Figure 13A:
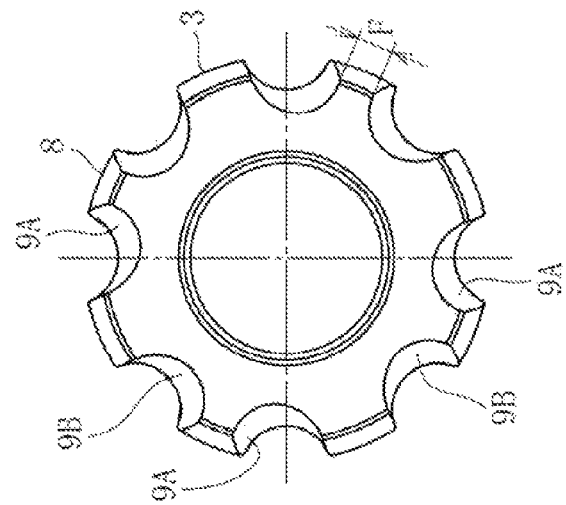
FIG. 13a is a left-hand side view of an inner joint member of the fixed type constant velocity universal joint of FIGS. 11a and 11b.
Figure 13B:
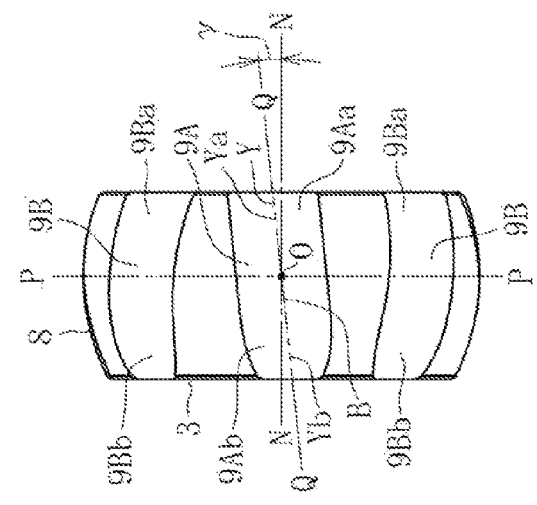
FIG. 13b is a view of an outer peripheral surface of the inner joint member of the fixed type constant velocity universal joint of FIGS. 11a and 11b.
Figure 13C:
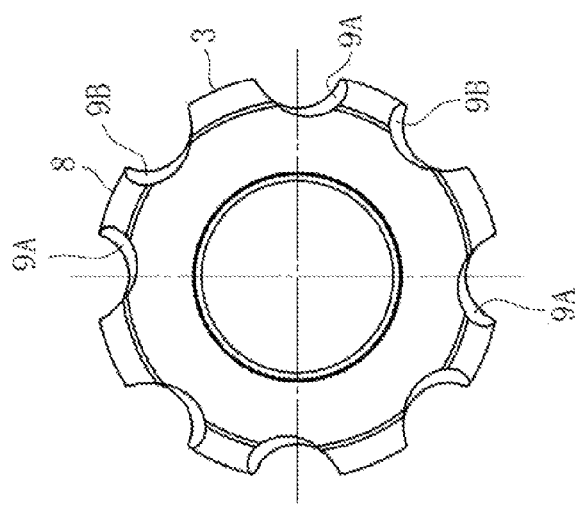
FIG. 13c is a right-hand side view of the inner joint member of the fixed type constant velocity universal joint of FIGS. 11a and 11b.

FIG. 13 illustrate a state in which the track grooves 9 of the inner joint member 3 are inclined in the peripheral direction with respect to the joint axial line N-N. FIG. 13b illustrates an outer peripheral surface of the inner joint member 3, FIG. 13a is a left-hand side view of the inner joint member 3, and FIG. 13c is a right-hand side view of the inner joint member 3. The inclined state of the track grooves 9 of the inner joint member 3 is the same as that of the first embodiment, and hence redundant description thereof is omitted.

Figure 14:
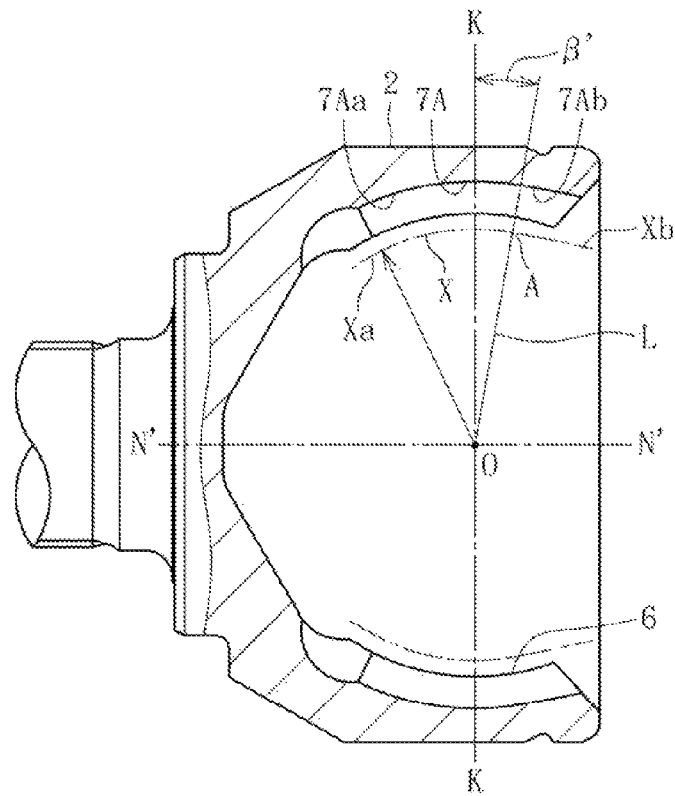
FIG. 14 is a partial vertical sectional view of details of track grooves of the outer joint member.

FIG. 14 illustrates details of the track grooves when viewed in the vertical cross section of the outer joint member 2. FIG. 14 is a sectional view of a partial vertical cross section in the plane M of FIG. 12a, which includes the ball raceway center line X of the track groove 7A and the joint center O. FIG. 14 also illustrates the track groove 7A of the outer joint member 2. Detailed description of the track groove 7B is omitted because the inclination direction of the track groove 7B is merely opposite to that of the track groove 7A and other structural details of the track groove 7B are the same as those of the track groove 7A. In the spherical inner peripheral surface 6 of the outer joint member 2, the track grooves 7A are formed along the axial direction. The track grooves 7A each have the ball raceway center line X, and each comprise the first track groove portion 7Aa having the arc-shaped ball raceway center line Xa about the curvature center at the joint center O (not offset in the axial direction), and the second track groove portion 7Ab having the linear ball raceway center line Xb. In addition, the linear ball raceway center line Xb of the second track groove portion 7Ab is smoothly connected as a tangent to the end portion A on the opening side of the ball raceway center line Xa of the first track groove portion 7Aa. The end portion A is positioned on the opening side with respect to the joint center O. Thus, the linear ball raceway center line Xb of the second track groove portion 7Ab, which is connected as a tangent to the end portion A on the opening side of the ball raceway center line Xa of the first track groove portion 7Aa, is formed to come closer to the joint axial line N-N (see FIG. 11a) as the distance to the opening side becomes smaller. With this, at a maximum operating angle, an effective track length can be secured, and formation of excessively high wedge angles can be suppressed.

Also in this embodiment, L represents the straight line connecting the end portion A and the joint center O. The angle β formed by the straight line L with respect to the plane P including the joint center O at the operating angle of 0° is the same as that of the first embodiment, and hence redundant description thereof is omitted.

Figure 15:
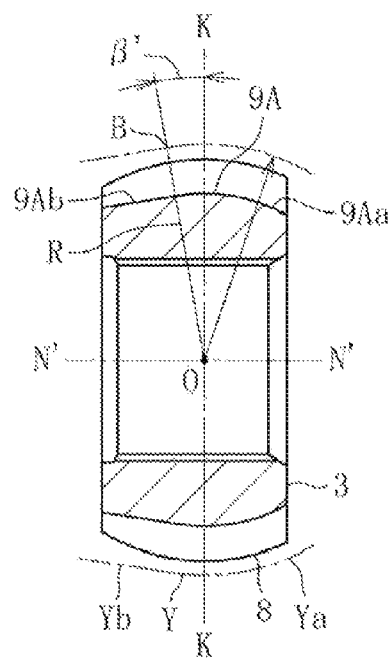
FIG. 15 is a vertical sectional view of details of track grooves of the inner joint member.

Similarly, FIG. 15 illustrates details of the track grooves in the vertical cross section of the inner joint member 3. FIG. 15 is a sectional view of a vertical cross section in the above-mentioned plane Q of FIG. 13b, which includes the ball raceway center line Y of the track groove 9A and the joint center O. FIG. 15 illustrates the track groove 9A of the inner joint member 3. Detailed description of the track groove 9B is omitted because the inclination direction of the track groove 9B is merely opposite to that of the track groove 9A and other structural details of the track groove 9B are the same as those of the track groove 9A. In the spherical outer peripheral surface 8 of the inner joint member 3, the track grooves 9A are formed along the axial direction. The track grooves 9A each have the ball raceway center line Y, and each comprise the first track groove portion 9Aa having the arc-shaped ball raceway center line Ya about the curvature center at the joint center O (not offset in the axial direction), and the second track groove portion 9Ab having the linear ball raceway center line Yb. In addition, the ball raceway center line Yb of the second track groove portion 9Ab is smoothly connected as a tangent to the end portion B on the interior side of the ball raceway center line Ya of the first track groove portion 9Aa. That is, the end portion B is a connecting point between the first track groove portion 9Aa and the second track groove portion 9Ab. The end portion B is positioned on the interior side with respect to the joint center O. Thus, the linear ball raceway center line Yb of the second track groove portion 9Ab, which is connected as a tangent to the end portion B on the interior side of the ball raceway center line Ya of the first track groove portion 9Aa, is formed to come closer to the joint axial line N-N (see FIG. 11a) as the distance to the interior side becomes smaller. With this, at a maximum operating angle, the effective track length can be secured, and formation of excessively high wedge angles can be suppressed.

Also in this embodiment, R represents the straight line connecting the end portion B and the joint center O. The angle β formed by the straight line R with respect to the plane P including the joint center O at the operating angle of 0° is the same as that of the first embodiment, and hence redundant description thereof is omitted.

Figure 16:
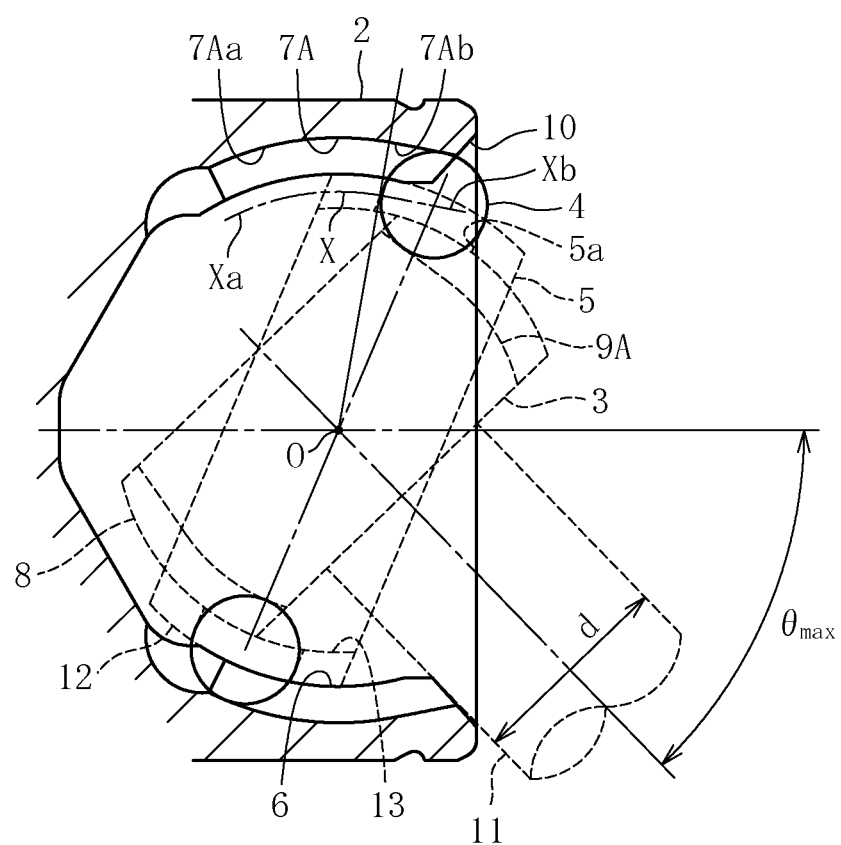
FIG. 16 is a schematic view of a state in which the joint forms a maximum operating angle.

FIG. 16 illustrates a state in which the constant velocity universal joint according to this embodiment forms a maximum operating angle. In the track groove 7A of the outer joint member 2, the second track groove portion 7Ab having the linear ball raceway center line Xb is formed on the opening side. Irrespective of the compact design, by forming the second track groove portion 7Ab, at the maximum operating angle, the effective track length can be secured, and formation of excessively high wedge angles can be suppressed. Thus, as illustrated in FIG. 16, even in a case where the maximum operating angle $\theta_{max}$ is set as high as approximately 50° and the inlet chamfer 10 having a necessary and sufficient size is formed, the ball 4 and the second track groove portion 7Ab can be reliably held in contact, and formation of high wedge angles can be suppressed.

Figure 17B:
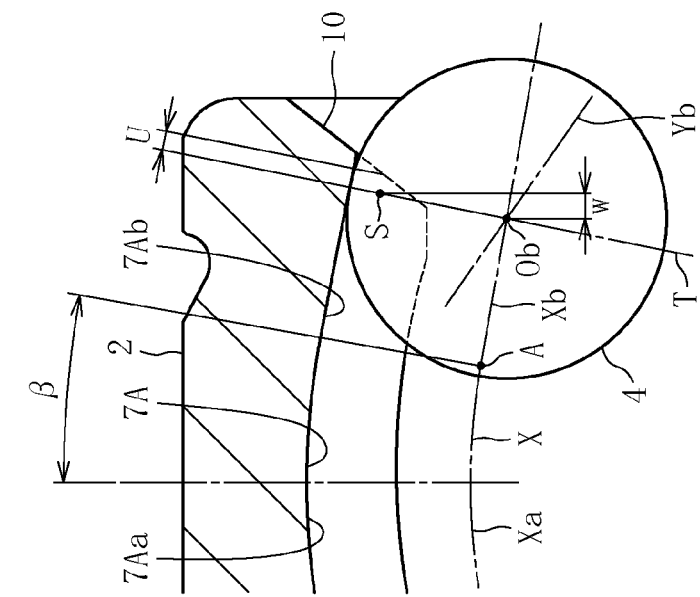
Figure 17A:
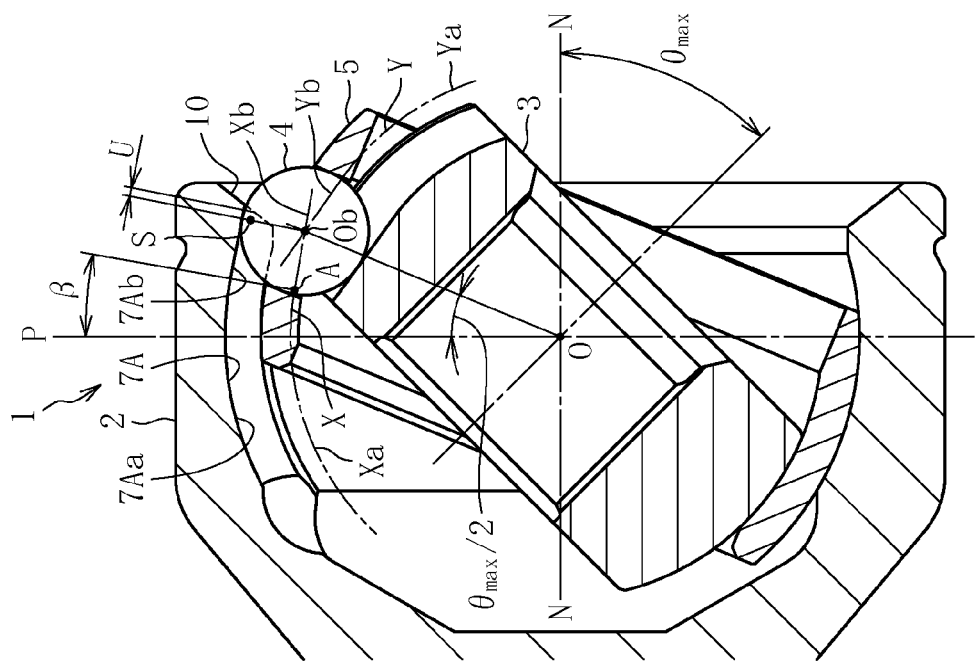
FIG. 17a is a view of a contact state between a ball and the track grooves under the state in which the joint forms the maximum operating angle.
Figure 26B:
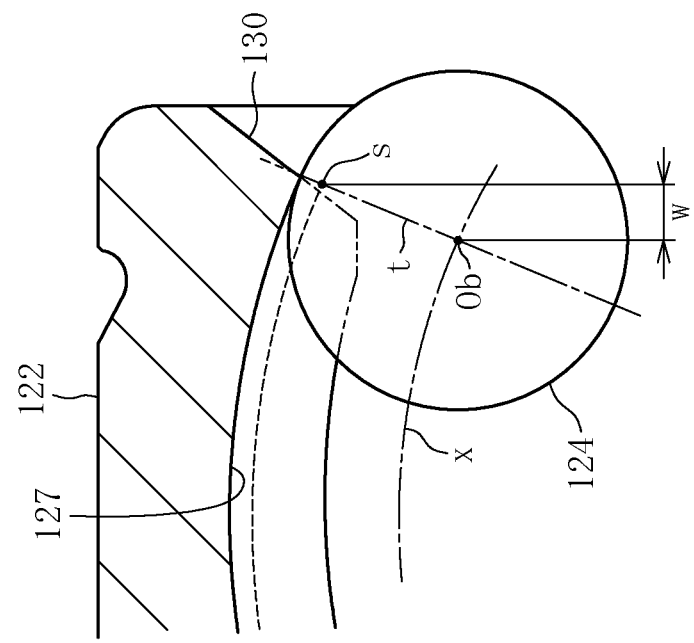
Figure 26A:
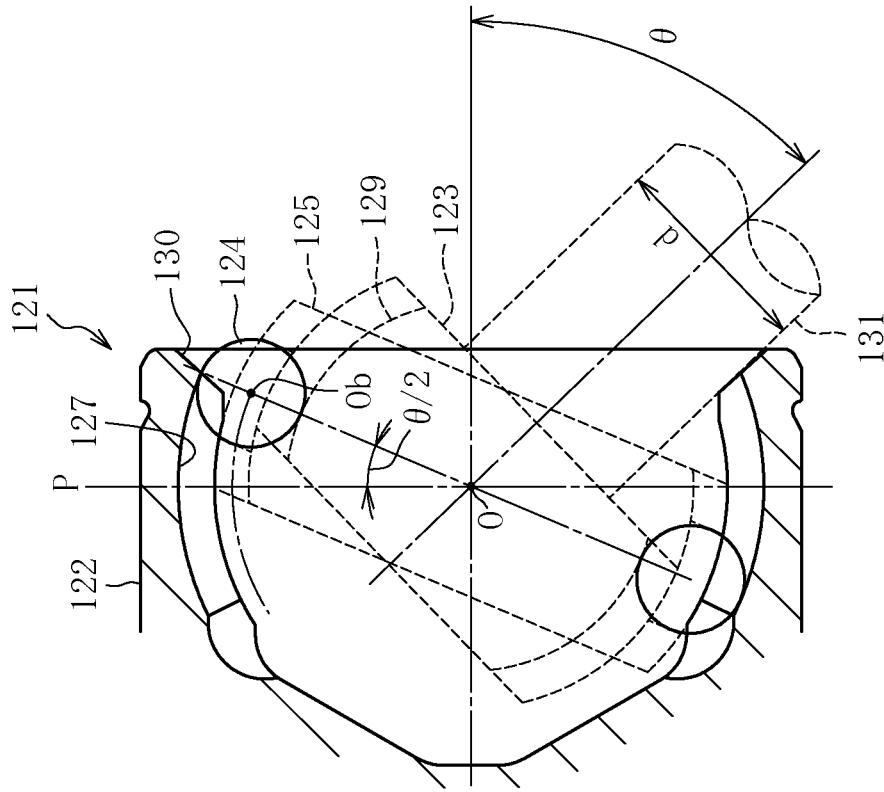
FIG. 26a is a schematic view of a state in which the fixed type constant velocity universal joint of FIG. 25 forms a high operating angle.

Further, referring to FIG. 17, detailed description is given of a contact state between the track grooves and the ball at the maximum operating angle of the constant velocity universal joint according to this embodiment. FIG. 17a is a vertical sectional view of the constant velocity universal joint 1, and FIG. 17b is an enlarged view of a contact state between the track groove 7A of the outer joint member 2 and the ball 4. FIG. 17b also illustrates the track groove 7A of the outer joint member 2. Detailed description of the track groove 7B is omitted because the inclination direction of the track groove 7B is merely opposite to that of the track groove 7A and other structural details of the track groove 7B are the same as those of the track groove 7A. As illustrated in FIG. 17a, when the joint forms the maximum operating angle $\theta_{max}$, a center Ob of the ball 4 moves to a position of $\theta_{max}/2$ with respect to the plane P including the joint center O at the operating angle of 0°. At this time, a contact point S between the ball 4 and the second track groove portion 7Ab comes closest to the inlet chamfer 10. The linear ball raceway center line Xb of the second track groove portion 7Ab is connected as a tangent to the end portion A of the arc-shaped ball raceway center line Xa of the first track groove portion 7Aa. Thus, in the vertical cross section of FIG. 17a, the ball raceway center line Xb is inclined in a direction that comes closer to the joint axial line N-N as the distance to the opening side of the outer joint member 2 becomes smaller. As illustrated on an enlarged scale in FIG. 17b, the contact point S between the ball 4 and the second track groove portion 7Ab is positioned in a plane T that passes through the center Ob of the ball 4 and is orthogonal to the ball raceway center line Xb. The ball raceway center line Xb is linear, and hence an axial distance w between the center Ob of the ball 4 and the contact point S is smaller than that of a related-art constant velocity universal joint illustrated in FIG. 26b. Accordingly, the effective track length is increased. Thus, in this embodiment, at the maximum operating angle, a track allowance amount U can be secured between an edge portion of the inlet chamfer 10 and the contact point S, and the contact state between the ball 4 and the second track groove portion 7Ab can be sufficiently secured.

As described above, depending on the shape of the track groove 7, the contact point S between the track groove 7 of the outer joint member 2 and the ball 4 varies in position in the axial direction of the joint. Thus, in this specification and Scope of Claims, the effective track length at the maximum operating angle refers to a length of a trajectory of the contact point between the ball and the track groove in consideration of the variation in position in the axial direction of the contact point S as described above.

Figure 21B:
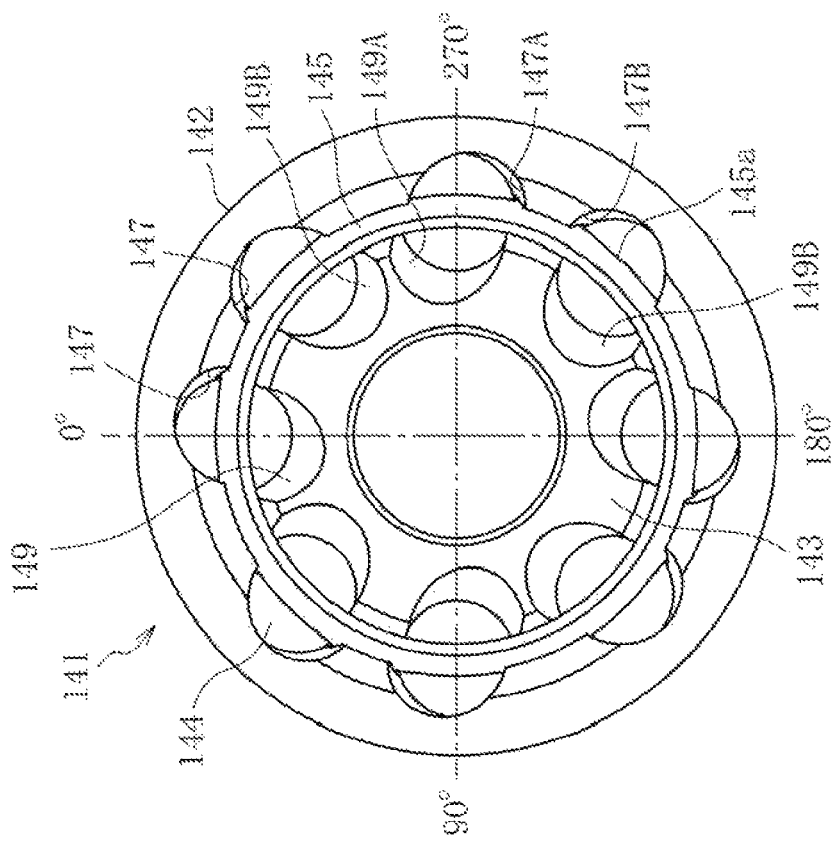
Figure 21A:
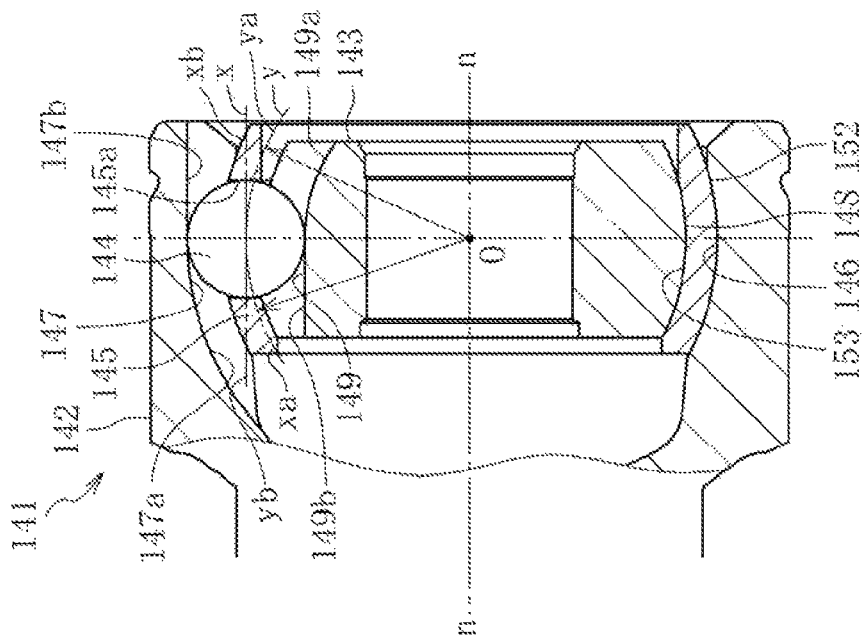
FIG. 21a is a partial vertical sectional view of the fixed type constant velocity universal joint, for illustrating technical findings in the process to arrive at the present invention.
Figure 22:
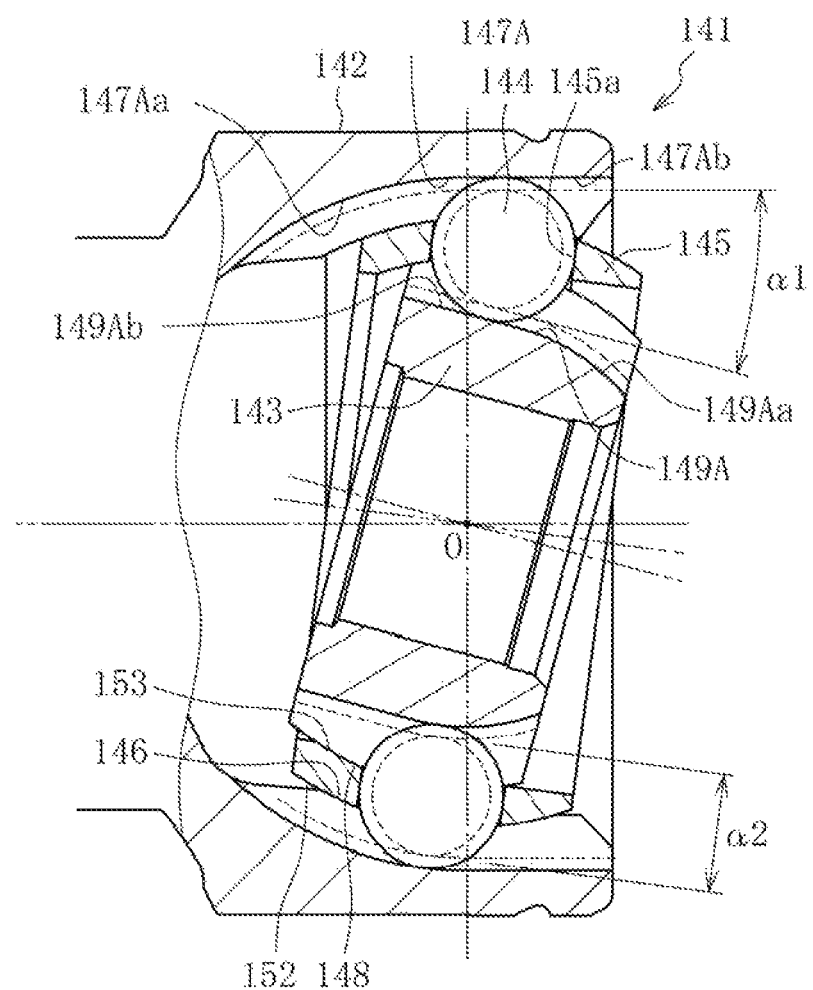
FIG. 22 is a view illustrating the technical findings in the process to arrive at the present invention.
Figure 23A:
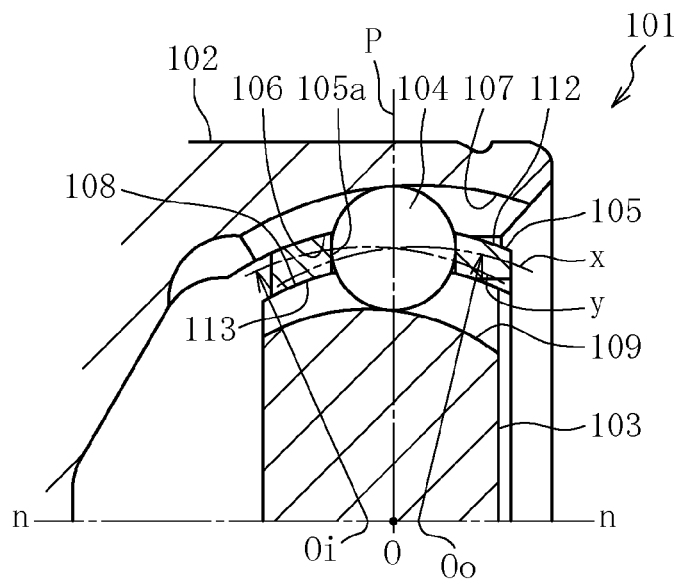
FIG. 23a is a vertical sectional view of a related-art fixed type constant velocity universal joint
Figure 23B:
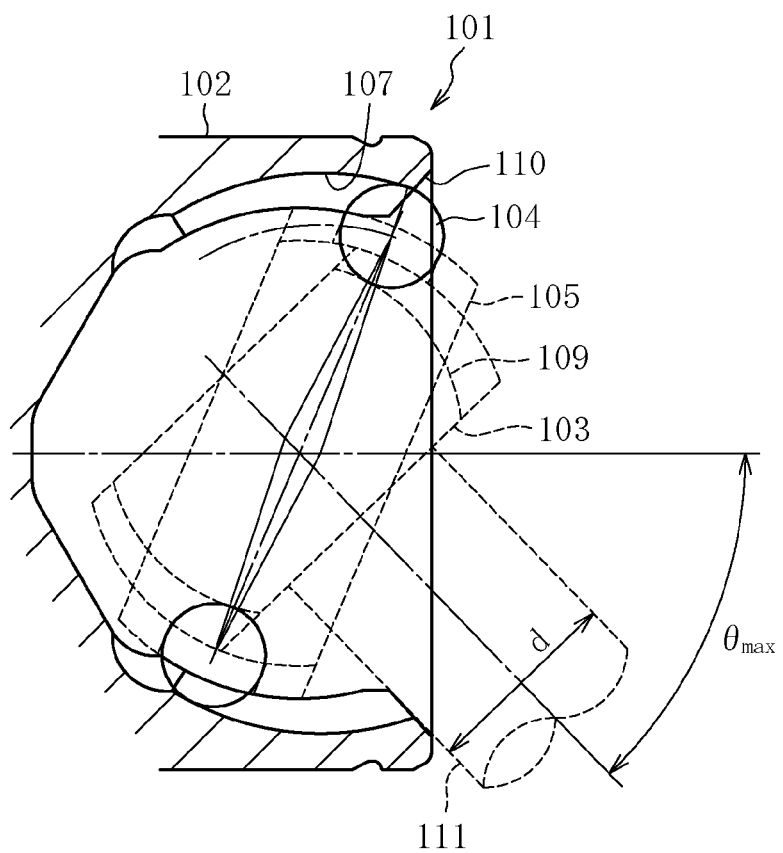
FIG. 23b is a schematic view of a state in which the fixed type constant velocity universal joint of FIG. 23a forms a maximum operating angle.
Figure 24:
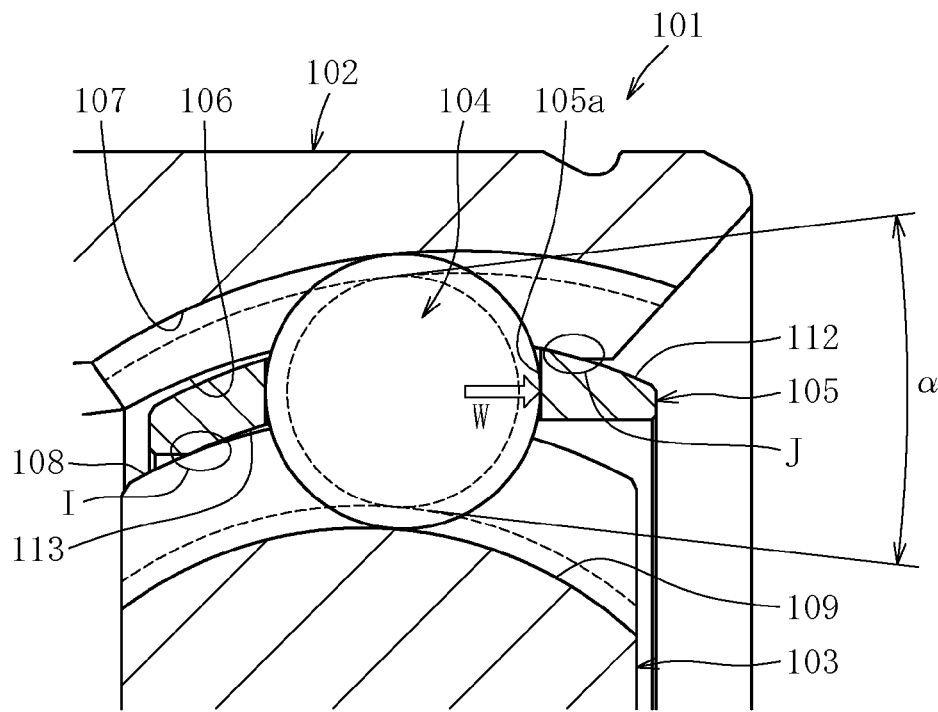
FIG. 24 is a vertical sectional view of a state of spherical surface contact.
Figure 25:
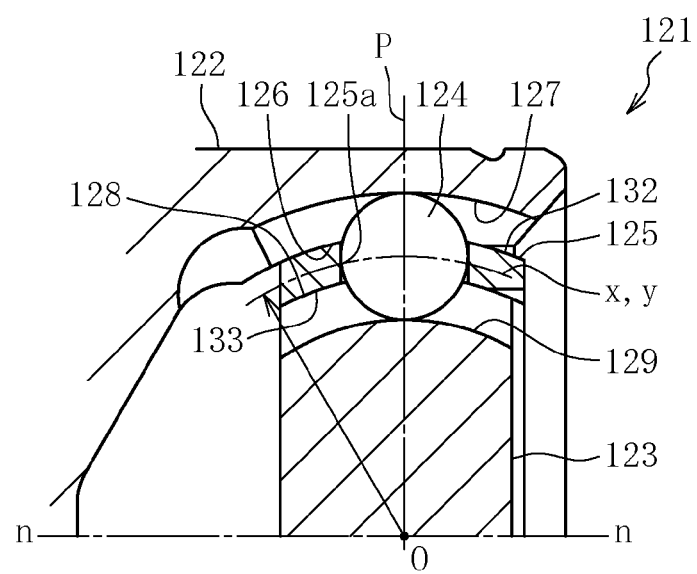
FIG. 25 is a vertical sectional view of a related-art fixed type constant velocity universal joint

Next, a feature of the constant velocity universal joint according to this embodiment, that is, a state of wedge angles at the maximum operating angle is described with reference to FIG. 18. FIG. 18a is a vertical sectional view of the constant velocity universal joint 1, and FIG. 18b is an enlarged view of states of wedge angles between the track groove 7A (7Ab) of the outer joint member 2 and the track groove 9A (9Ab) of the inner joint member 3. FIG. 18 also illustrate the track groove 7A of the outer joint member 2. Detailed description of the track groove 7B is omitted because the inclination direction of the track groove 7B is merely opposite to that of the track groove 7A and other structural details of the track groove 7B are the same as those of the track groove 7A. In the constant velocity universal joint 1 according to this embodiment, the track grooves 7A and 9A and the balls 4 are held in angular contact at a contact angle, and the ball raceway center lines X and Y of the track grooves 7A and 9A (see FIGS. 12a and 13b) each form an inclination angle γ. Thus, in this specification, the wedge angle between the track grooves refers to an actual wedge angle between contact points of the ball and the track grooves. However, in the illustration, the wedge angle is simplified through use of groove bottoms of the track grooves 7A and 9A. As illustrated in FIG. 18a, a wedge angle α between the track grooves 7A and 9A at the maximum operating angle $\theta_{max}$ of the constant velocity universal joint 1 according to this embodiment becomes highest when a phase angle in a rotation direction ranges from 300° to 360° (see FIG. 21b). The linear ball raceway center line Xb of the second track groove portion 7Ab of the outer joint member 2 is connected as a tangent to the end portion A of the arc-shaped ball raceway center line Xa of the first track groove portion 7Aa. Thus, at the operating angle of 0°, in the illustrated vertical cross section, the ball raceway center line Xb is inclined in the direction that comes closer to the joint axial line N-N as the distance to the opening side of the outer joint member 2 becomes smaller. On the other hand, the linear ball raceway center line Yb of the second track groove portion 9Ab of the inner joint member 3 is inclined in an opposite direction to that of the linear ball raceway center line Xb of the outer joint member 2. Thus, the second track groove portions 7Ab and 9Ab are formed to come closer to each other toward the opening side at the operating angle of 0°. Thus, the wedge angle α formed at the maximum operating angle can be decreased. As a result, a pop-out force of the ball 4 sandwiched between the linear second track groove portions 7Ab and 9Ab toward the opening side is decreased. Accordingly, the pocket loads of the cage 5 are decreased, and the strength of the cage 5 at the high operating angles can be secured.

How the wedge angle α at the maximum operating angle can be decreased is described in detail with reference to FIG. 18b. In FIG. 18b, the second track groove portions of the outer joint member 2 and the inner joint member 3 of the constant velocity universal joint 1 according to this embodiment are represented by 7Ab and 9Ab. In addition, second track groove portions of investigated Comparative Example 1 are represented by 7Ab' and 9Ab', and second track groove portions of investigated Comparative Example 2 are represented by 7Ab" and 9Ab". In the constant velocity universal joint 1 according to this embodiment, as described above, the second track groove portions 7Ab and 9Ab are formed to come closer to each other toward the opening side at the operating angle of 0°. Along with this, the decreased wedge angle α is formed at the maximum operating angle. On the other hand, in Comparative Example 1, groove bottoms of the second track groove portions 7Ab' and 9Ab' are formed parallel to each other at the operating angle of 0° in a cross section of FIG. 18b. Thus, a higher wedge angle α' is formed at the maximum operating angle. Further, in Comparative Example 2, groove bottoms of the second track groove portions 7Ab" and 9Ab" are formed apart from each other as the distance to the opening side of the outer joint member 2 becomes larger at the operating angle of 0°. Thus, an even higher wedge angle α" is formed at the maximum operating angle. In this way, in the constant velocity universal joint 1 according to this embodiment, the wedge angle α at the maximum operating angle can be decreased as compared to those in Comparative Examples 1 and 2. As described above, the effective track length is larger in Comparative Examples 1 and 2. However, it is preferred that the fixed type constant velocity universal joint according to this embodiment be practically employed because, at the maximum operating angle, the effective track length can be secured and the wedge angle can be suppressed.

FIG. 19 are perspective views of the outer joint member 2 and the inner joint member 3 of the constant velocity universal joint according to this embodiment. Those perspective views are similar to those in the first embodiment. Further, the fitting state of the balls and the pockets of the cage and the effects thereby are the same as those in the fixed type constant velocity universal joint according to the first embodiment, and hence redundant description thereof is omitted.

Figure 20:
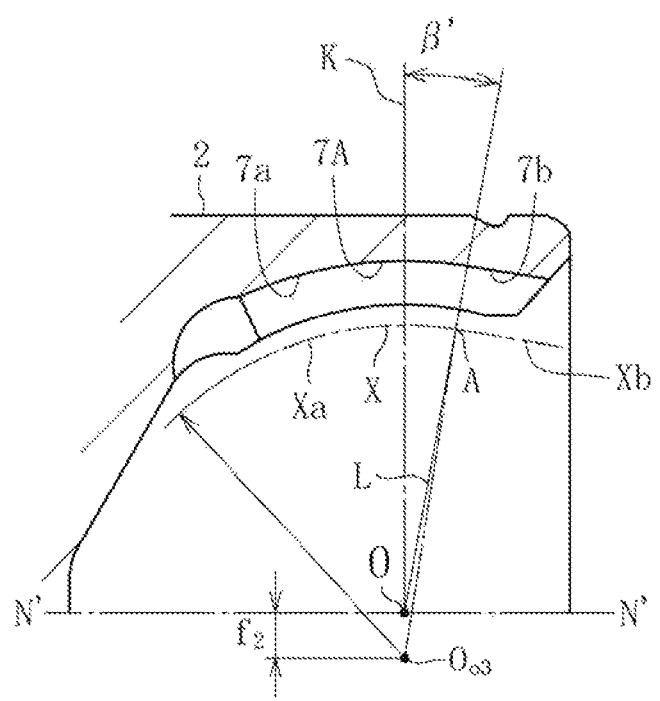
FIG. 20 is a vertical sectional view of an outer joint member of a fixed type constant velocity universal joint according to a fourth embodiment of the present invention.

Description is given of a fixed type constant velocity universal joint according to a fourth embodiment of the present invention with reference to FIG. 20. FIG. 20 is a sectional view similar to FIG. 14, for illustrating only an outer joint member of the fixed type constant velocity universal joint according to this embodiment. The fixed type constant velocity universal joint is different from the fixed type constant velocity universal joint according to the third embodiment described above in that the curvature centers of the arc-shaped ball raceway center lines of the first track groove portions are offset in the radial direction with respect to the joint axial line N-N, and that the structures of the linear ball raceway center lines of the second track groove portions are adjusted along with the above-mentioned offset. Other structural details are the same as those of the third embodiment. Also in this embodiment, parts having similar functions to those of the first and third embodiments are represented by the same reference symbols to omit redundant description thereof.

The end portion A on the opening side of the ball raceway center line Xa of the first track groove portion 7a of the outer joint member 2 is the same as that of the first embodiment. However, the curvature center $O_{o3}$ of the ball raceway center line Xa of the first track groove portion 7a is not offset in the axial direction with respect to the joint center O, but is offset by $f_2$ in the radial direction with respect to the joint axial line. Along with this, the linear ball raceway center line Xb of the second track groove portion 7b is adjusted so as to be smoothly connected as a tangent to the end portion A on the opening side of the ball raceway center line Xa of the first track groove portion 7a. With this structure, track groove depths on the interior side of the joint can be adjusted. Although illustration is omitted, also in the fixed type constant velocity universal joint according to this embodiment, the ball raceway center line Y of the track groove 9 of the inner joint member 3 is formed so as to be mirror-image symmetrical with the ball raceway center line X of the paired track groove 7 of the outer joint member 2 with respect to the plane P including the joint center O at the operating angle of 0°. The inclined state in the peripheral direction of the track grooves 7 and 9 of the outer joint member 2 and the inner joint member 3 with respect to the joint axial line N-N, the effects by the cage and the joint, and the fitting state of the balls and the pockets of the cage and the effects thereby are the same as those in the fixed type constant velocity universal joint according to the first embodiment, and hence redundant description thereof is omitted.

EXAMPLES

Examples and Comparative Examples of the present invention are described below. In Examples and Comparative Examples, eight-ball fixed type constant velocity universal joints according to the third embodiment were prepared to have pocket clearances δ that were variously set as shown in Table 1. A size of the joints corresponds to a nominal size of 25.4 in Table 3 on page 3 of an automotive standard (JASO C 304-89: "Constant Velocity Universal Joints for Halfshaft of Automobiles" established on Mar. 31, 1989, and published by Society of Automotive Engineers of Japan, Inc.).

TABLE 1

| | Pocket Clearance δ (μm) | Torque Loss Rate | Operability | Comprehensive Evaluation |
|---|---|---|---|---|
| Comparative Example 1 | −35 | X | ○ | X |
| Example 1 | −30 | ○ | ○ | ○ |
| Example 2 | −20 | ○ | ○ | ○ |
| Example 3 | −10 | ○ | ○ | ○ |
| Example 4 | 0 | ○ | ○ | ○ |
| Example 5 | 10 | ○ | ○ | ○ |
| Example 6 | 20 | ○ | ○ | ○ |
| Example 7 | 30 | ○ | ○ | ○ |
| Example 8 | 40 | ○ | ○ | ○ |
| Comparative Example 2 | 50 | ○ | Δ | Δ |

[Torque Loss Rate]

Torque loss rates were obtained by calculating decreasing rates through subtraction of measured output torque from measured input torque. Meanings of the marks as determination criteria are defined as follows.
  ○: lower than that of the related-art eight-ball Rzeppa type constant velocity universal joint
  x: equivalent to that of the related-art constant velocity universal joint
The evaluation results of Table 1 demonstrated that the torque loss rate was equivalent to that of the related-art constant velocity universal joint when the pocket clearance δ was set to −35 μm, and the torque loss rate was decreased within the range of −30 μm≤δ≤40 μm.

[Operability]

Operability was checked through manual cross operation. Meanings of the marks as determination criteria are defined as follows.
  ○: the shaft was not caught in the cross operation
  Δ: the shaft was not slightly caught in the cross operation
The evaluation results of Table 1 demonstrated that the shaft was slightly caught in the cross operation when the pocket clearance δ was set to 50 μm, and the operability was not decreased within the range of −30 μm≤δ≤40 μm. As a comprehensive evaluation obtained by the above-mentioned evaluation results of the torque loss rate and the operability, it was verified that a preferred range of the pocket clearance δ was −30 μm≤δ≤40 μm.

[Temperature Rise Amount]

Although not described in detail, in Examples 5 to 8, it was demonstrated that a temperature rise amount was successfully decreased by 50% or more as compared to that of the related-art eight-ball Rzeppa fixed type constant velocity universal joint under the following testing condition.

(Testing Condition) number of revolutions: 5,000 rpm, load torque: 196 Nm, and operating angle: 8°

The fixed type constant velocity universal joints 1 according to the embodiments described above have the structural advantage of the crossing track grooves. Thus, the spherical contact between the cage 5 and both the outer joint member 2 and the inner joint member 3 can be suppressed, and hence the effect of suppressing friction loss can be obtained. In addition, the pocket clearance δ is set within the range in which the balls 4 and the pockets 5a of the cage 5 are fitted with both the interference fit and the clearance fit, which provides the additional effect of the further suppression of friction loss and heat generation. Even higher efficiency can be achieved synergistically by those effects. Transmission efficiency is improved, and hence, when the fixed type constant velocity universal joint 1 is mounted to an automobile, this automobile is suppressed in fuel consumption.

In the fixed type constant velocity universal joints according to the embodiments described above, the number of the balls 4 is set to eight. However, the present invention is not limited thereto. It is preferred that the number of the balls be set to ten, or the present invention may be appropriately carried out in such an embodiment that the number of the balls is set to twelve.

Further, in the fixed type constant velocity universal joint according to the embodiments described above, the ball raceway center line Xb of the second track groove portion is formed into an arc shape. However, the present invention is not limited thereto. It is only necessary that the shape of the ball raceway center line Xb of the second track groove portion be different from that of the ball raceway center line Xa of the first track groove portion so as to increase the effective track length and therefore achieve high operating angles. Under this condition, any shape may be employed as appropriate, and for example, an elliptical shape may be employed as well. Further, the first track groove portion and the second track groove portion are not limited to the single arc, and may each be formed of a plurality of arcs in consideration of the track groove depths and the like. Still further, in the above description, the track grooves are arranged at a regular pitch in the peripheral direction, but the track grooves may be arranged at an irregular pitch. Yet further, the inclination angles γ of the first track groove portions with respect to the joint axial line N-N are set equal to each other in all the track grooves, but the present invention is not limited thereto. The inclination angles γ of the paired first track groove portions and other paired first track groove portions of the outer joint member and the inner joint member may be set unequal to each other. It is only necessary that the inclination angles be set so that the axial forces of the balls are applied in a balanced manner as a whole to all the pocket portions of the cage in the peripheral direction. In addition, in the embodiments described above, the track grooves and the balls are held in angular contact at a contact angle. However, the present invention is not limited thereto. The track grooves and the balls may be held in circular contact by forming the track grooves into a circular shape in horizontal cross section.

The present invention is not limited to the embodiments described above, and as a matter of course, may be carried out in various other embodiments without departing from the spirit of the present invention. The scope of the present invention is defined in the claims, and encompasses meaning of equivalents of elements described in the claims and all modifications within the scope of claims.

DESCRIPTION OF REFERENCE SIGNS 1 fixed type constant velocity universal joint
2 outer joint member
3 inner joint member
4 ball
5 cage
6 spherical inner peripheral surface
7 track groove
7a first track groove portion
7b second track groove portion
8 spherical outer peripheral surface
9 track groove
9a first track groove
9b second track groove
11 shaft
12 spherical outer peripheral surface
13 spherical inner peripheral surface
20 drive shaft
A end portion
B end portion
Db diameter of ball
H axial dimension of pocket
$f_2$ offset amount
K perpendicular line
L straight line
M plane including ball raceway center line
N joint axial line
O joint center
P joint center plane
Q plane including ball raceway center line
$O_{o1}$ curvature center
$O_{o3}$ curvature center
$O_{o4}$ curvature center
R straight line
X ball raceway center line
Y ball raceway center line
γ inclination angle
β angle
θ operating angle

The invention claimed is:

1. A fixed type constant velocity universal joint, comprising:
an outer joint member having a spherical inner peripheral surface in which a plurality of track grooves is formed so as to extend in an axial direction of the outer joint member,
the outer joint member having an opening side and an interior side spaced apart from each other in the axial direction;
an inner joint member having a spherical outer peripheral surface in which a plurality of track grooves is formed so as to be paired with the plurality of track grooves of the outer joint member;
a plurality of balls for transmitting torque,
the plurality of balls being interposed between the plurality of track grooves of the outer joint member and the plurality of track grooves of the inner joint member; and
a cage comprising pockets for receiving the plurality of balls,
the cage having a spherical outer peripheral surface and a spherical inner peripheral surface, which are fitted to the spherical inner peripheral surface of the outer joint member and the spherical outer peripheral surface of the inner joint member, respectively,
wherein the plurality of track grooves of the outer joint member comprises:
first track groove portions (7a) positioned on the interior side; and
second track groove portions (7b) positioned on the opening side,
wherein each of the first track groove portions (7a) comprises an arc part having a curvature center that is positioned without being offset in the axial direction with respect to a joint center (O),
wherein the first track groove portions (7a) are inclined in a peripheral direction of the outer joint member with respect to a joint axial line (N-N) and are adjacent to each other in the peripheral direction with inclination directions opposite to each other,
wherein each of the second track groove portions (7b) is formed into a different shape from a shape of each of first track groove portions (7a) so as to increase an effective track length at a maximum operating angle,
wherein each of first track groove portions (7a) and each of the second track groove portions (7b) are connected to each other at a position on the opening side with respect to the joint center (O),
wherein each of the plurality of track grooves of the inner joint member is formed so as to be mirror-image symmetrical with a corresponding one of the plurality of track grooves of the outer joint member with respect to a plane (P) including the joint center (O) at an operating angle of 0°, and
wherein a pocket clearance (δ) is set within a range in which the plurality of balls and the pockets of the cage are fitted with an interference fit or a clearance fit.

2. The fixed type constant velocity universal joint according to claim 1, wherein the pocket clearance (δ) is within a range of −30 μm≤δ≤40 μm.

3. The fixed type constant velocity universal joint according to claim 1, wherein an angle (β) formed by a straight line (L) connecting the joint center (O) and a connection point between each of the first track groove portions (7a) and each of the second track groove portions (7b) with respect to the plane (P) including the joint center (O) at the operating angle of 0° is 3° to 10°.

4. The fixed type constant velocity universal joint according to claim 1, wherein the curvature center of the arc part of each of the first track groove portions (7a) is arranged on the joint axial line (N-N).

5. The fixed type constant velocity universal joint according to claim 1, wherein the curvature center of the arc part of each of the first track groove portions (7a) is offset in a radial direction with respect to the joint axial line (N-N).

6. The fixed type constant velocity universal joint according to claim 1, wherein each of the second track groove portions (7b) comprises an arc part.

7. The fixed type constant velocity universal joint according to claim 1, wherein an arc part of each of the second track groove portions (7b) has a curvature center offset to a radially outer side with respect to each of the first track groove portions (7a) and offset to the opening side with respect to the joint center (O).

8. The fixed type constant velocity universal joint according to claim 1, wherein each of the second track groove portions (7b) comprises a linear part, and the linear part is formed with an inclination so as to come closer to the joint axial line (N-N) as a distance to the opening side becomes smaller.

9. The fixed type constant velocity universal joint according to claim 2, wherein an angle ($\beta$) formed by a straight line (L) connecting the joint center (O) and a connection point between each of the first track groove portions (7a) and each of the second track groove portions (7b) with respect to the plane (P) including the joint center (O) at the operating angle of 0° is 3° to 10°.

10. The fixed type constant velocity universal joint according to claim 2, wherein the curvature center of the arc part of each of the first track groove portions (7a) is arranged on the joint axial line (N-N).

11. The fixed type constant velocity universal joint according to claim 2, wherein the curvature center of the arc part of each of the first track groove portions (7a) is offset in a radial direction with respect to the joint axial line (N-N).

12. The fixed type constant velocity universal joint according to claim 2, wherein each of the second track groove portions (7b) comprises an arc part.

13. The fixed type constant velocity universal joint according to claim 2, wherein an arc part of each of the second track groove portions (7b) has a curvature center offset to a radially outer side with respect to each of the first track groove portions (7a) and offset to the opening side with respect to the joint center (O).

14. The fixed type constant velocity universal joint according to claim 2, wherein each of the second track groove portions (7b) comprises a linear part, and the linear part is formed with an inclination so as to come closer to the joint axial line (N-N) as a distance to the opening side becomes smaller.

* * * * *